United States Patent [19]

Moroto et al.

[11] Patent Number: 5,669,846

[45] Date of Patent: Sep. 23, 1997

[54] CONTINUOUSLY VARIABLE TRANSMISSION WITH CONTROL OF SWITCHING BETWEEN A HIGH MODE AND A LOW MODE

[75] Inventors: Shuzo Moroto, Nagoya; Takao Taniguchi; Shoichi Miyagawa, both of Okazaki; Shiro Sakakibara, Anjo; Kazumasa Tsukamoto, Toyota; Takeshi Inuzuka; Masashi Hattori, both of Anjo, all of Japan

[73] Assignee: Aisin AW Co., Ltd., Japan

[21] Appl. No.: 620,190

[22] Filed: Mar. 22, 1996

[30] Foreign Application Priority Data

| Mar. 24, 1995 | [JP] | Japan | 7-66234 |
| May 26, 1995 | [JP] | Japan | 7-128701 |
| May 26, 1995 | [JP] | Japan | 7-128702 |

[51] Int. Cl.⁶ ............................................. F16H 9/26
[52] U.S. Cl. ................................. 475/211; 477/45
[58] Field of Search ........................... 475/208, 211; 477/45

[56] References Cited

U.S. PATENT DOCUMENTS

| 4,290,320 | 9/1981 | Abbott | 74/689 |
| 4,402,237 | 9/1983 | Tomlinson | 74/689 |
| 4,553,450 | 11/1985 | Gizard | 74/689 |
| 4,644,820 | 2/1987 | Macay et al. | 74/689 |
| 5,203,233 | 4/1993 | Hattori et al. | 477/45 |

FOREIGN PATENT DOCUMENTS

| 56-49456 | 5/1981 | Japan. |
| 56-52653 | 5/1981 | Japan. |
| 59-110954 | 6/1984 | Japan. |
| 6331000 | 11/1994 | Japan. |

*Primary Examiner*—Dirk Wright
*Attorney, Agent, or Firm*—Lorusso & Loud

[57] ABSTRACT

A continuously variable transmission system includes a belt type continuously variable transmission unit (CVT) wherein the direction of torque transmission is switched by torque circulation between a low mode and a high mode accompanied by a change in the axial forces on the pulleys of the CVT. In the Low mode of the D range, a comparatively high hydraulic pressure from a regulator valve is supplied to a Low clutch hydraulic servo via a low-high shifting valve and to a secondary hydraulic servo. In addition, a comparatively low hydraulic pressure from a ratio control valve is supplied to a primary hydraulic servo. These oil pressure feeds are reversed by the switching of the low-high shifting valve.

12 Claims, 23 Drawing Sheets

| Elements / Manual Position | Primary Hydraulic Servo 32 | | Secondary Hydraulic Servo 33 | | $C_L$ | $C_H$ |
|---|---|---|---|---|---|---|
| | 1st Hydraulic Chamber 45 | 2nd Hydraulic Chamber 47 | 1st Hydraulic Chamber 46 | 2nd Hydraulic Chamber 49 | | |
| P | ◯ | | ◯ | | ◯ | |
| R | ◯ | ◯ | ◯ | | | |
| N | ◯ | | ◯ | | | |
| D  L | ◯ | | ◯ | ◯ | ◯ | |
| D  H | ◯ | ◯ | ◯ | | | ◯ |

FIG. 8

| Elements / Manual Position | Primary Hydraulic Servo 32 | | Secondary Hydraulic Servo 33 | | $C_L$ | $C_H$ |
|---|---|---|---|---|---|---|
| | $P_L - L (57)$ | $P_L - H (56)$ | $P_L - L (57)$ | $P_L - H (56)$ | | |
| P | ○ | | ○ | | | |
| R | | ○ | ○ | | ○ | |
| N | ○ | | ○ | | | |
| D  L | ○ | | | ○ | ○ | |
| D  H | | ○ | ○ | | | ○ |

FIG. 13

General Flow Chart

CONTINUOUSLY VARIABLE TRANSMISSION WITH CONTROL OF SWITCHING BETWEEN A HIGH MODE AND A LOW MODE

BACKGROUND OF THE INVENTION

1. Field of the Invention

The present invention relates to a continuously variable transmission system including a belt type continuously variable transmission unit composed of a primary pulley and a secondary pulley, each composed of two sheaves, and a belt trained around the primary and secondary pulleys, and more specifically, to control of the axial forces on the belt type continuously variable transmission unit when switching between Low mode and High mode. The continuously variable transmission system combines the belt type continuously variable transmission unit with a planetary gear unit and is particularly suitable for use in automobiles.

2. Description of the Prior Art

Belt type continuously variable transmissions have attracted attention for use in automobiles to cope with requirements for improved fuel efficiency, driving performance and the like.

As shown in, for example, Japanese Patent Application Laid-Open No. 7-331000, an automotive continuously variable transmission system including a continuously variable transmission unit, an uniform speed transmission unit, a planetary gear unit and first and second clutches. In this prior art transmission, the output side of the torque converter is coupled to the planetary gear unit, and also the first clutch is interposed between the output side of the continuously variable transmission unit and the sun gear so as to pass a part of the circulating torque through the first clutch.

In the above continuously variable transmission, the output side of the uniform transmission unit and the output side of the continuously variable transmission unit are input to the carrier and to the sun gear, respectively, of the planetary gear unit and are integrated therein and output through the ring gear. The gear ratio of the continuously variable transmission unit is increased and by this increase the unit is shifted from the under drive state to the over drive state by means of torque circulation, while the overall gear ratio of the whole transmission is decreased. In addition, the output side of the continuously variable transmission unit is entirely output as output of the whole transmission by releasing the first clutch and engaging the second clutch. Therefore, the gear ratio of the continuously variable transmission unit becomes that of the whole transmission.

In the Low mode where the above first clutch is engaged, the continuously variable transmission unit transmits the power from the secondary side to the primary side by means of torque circulation. In the High mode where the second clutch is engaged, the continuously variable transmission unit transmits the power from the primary side to the secondary side by means of torque circulation.

The belt type continuously variable transmission changes pulley ratio by changing axial forces (belt holding pressures) on the drive side pulley and the driven side pulley. For power transmission with a predetermined pulley ratio, the ratio of axial forces on the pulleys should be adjusted to a predetermined level. In this case, however, it is required that the axial force on the drive side pulley be higher than that on the driven side pulley.

Even though the direction of transmitting the power is changed in accordance with shifting between the Low mode and the High mode in the above continuously variable transmission, there is no consideration given to the axial forces on the pulleys. Transmission control at the time of shifting between the Low mode and the High mode becomes inconvenient in that it takes much time to become stable and it might delay response.

SUMMARY OF THE INVENTION

Accordingly, an object of the present invention is to provide a continuously variable transmission capable of solving the above problem by changing the axial forces acting on both the pulleys of a belt type continuously variable transmission unit.

Accordingly, the present invention provides a continuously variable transmission system including an input shaft associated with an engine output shaft, an output shaft for driving the vehicle wheels, a belt type continuously variable transmission unit having a first pulley associated with the input shaft, a second pulley, a belt trained around both the pulleys and an axial force actuating means for applying axial forces to both the pulleys for changing the pulley ratio of the first and second pulleys. The transmission system further includes a planetary gear unit having at least first, second and third rotary elements, with the first rotary element associated with the input shaft, the second rotary element associated with the second pulley and the third rotary element associated with the output shaft, respectively. A first clutch ($C_L$) is interposed between the input shaft and the first rotary (e.g. the carrier), whereby power transmission therebetween is engaged or disengaged by the first clutch. A second clutch ($C_H$) is interposed between any two (e.g. sun gear and ring gear) of the first, second and third rotary elements of the planetary gear set, whereby power transmission therebetween is engaged or disengaged by the second clutch. Low-High shifting means provides for shifting between a Low mode providing a comparatively high torque ratio by engaging the first clutch and a High mode providing a comparatively low torque ratio by engaging the second clutch, whereby direction of torque transmission between the first pulley and the second pulley of the belt type continuously variable transmission unit is changed. Control means is provided for controlling the axial force actuating means so that axial forces acting on the first and second pulleys produce a difference corresponding to the pulley ratio. Switching means changes the relative relationship in magnitude between the axial forces which act on the first and second pulleys, with control by the control means based on switching between the Low mode and the High mode by the Low-High shifting means.

The axial force actuating means, in one embodiment, includes a first hydraulic servo acting on the first pulley and a second hydraulic servo acting on the second pulley. Axial forces are applied to the first and second pulleys by supplying hydraulic pressures from an oil pump to the first and second hydraulic servos. The switching means may be a servo switching valve for switching the hydraulic pressure acting on the first hydraulic servo and the hydraulic pressure acting on the second hydraulic servo. Since the hydraulic pressures supplied to the first and second servos are reversed by the switching valve, the shifting between the Low mode and the High mode can be properly attained merely by switching the hydraulic pressure paths by means of the servo switching valve, without need for controlling the respective pressures of both hydraulic pressure servos.

The Low-High shifting means may be a Low-High shifting valve and may be located in an oil passage supplying the hydraulic pressure from the oil pump to the respective hydraulic servos ($C_L$) ($C_H$) of the first clutch and the second clutch. The Low-High shifting valve switches between supply and release of the hydraulic servos. The servo switching valve may be constructed integrally with the Low-High shifting valve or may be separated from the Low-High shifting valve and switched by hydraulic pressure from the first or second clutch hydraulic servo, which is generated by switching the Low-High shifting valve, as shown in, for example, FIG. 4 to FIG. 15. Where the switching valve is integrally constructed with the Low-High shifting valve, the change in axial forces effected on both pulleys and the shifting operation of the first and the second clutches can be simultaneously and integrally performed. Therefore, the Low mode and the High mode can be properly attained while preventing a malfunction such as engagement of the clutch in the High mode when the relationship of the axial forces is in the Low mode. On the other hand, when the switching valve for reversing the axial forces between the pulleys is separate from the Low-High shifting valve for shifting the first and second clutches, it allows a simple construction by simplifying the functions of the Low-High shifting valve and the servo switching valve. As the switching valve can be switched with the shifting movement of the Low-High shifting valve, either the Low or the High mode can be achieved without malfunction.

Each of the first and second hydraulic servos may have a plurality of hydraulic chambers, and the servo switching valve selectively switches the hydraulic chambers to which hydraulic pressures are supplied to thereby reverse the effective pressure receiving areas of the first and second hydraulic servos, as shown in, for example, FIG. 4 to FIG. 8 and FIG. 14. Since each of the first and second hydraulic servos has a plurality of hydraulic chambers, the Low mode and High mode can be easily and securely switched by reversing the effective pressure receiving areas of the hydraulic servos by reversing the hydraulic pressures supplied to the hydraulic chambers, without need for regulating the hydraulic pressures acting on the hydraulic servos.

Where the first and second hydraulic servos have at least a first hydraulic chamber and a second hydraulic chamber, these first and second hydraulic chambers may have the same effective pressure-receiving areas. The control means may include a regulator valve and a ratio control valve, the hydraulic pressure from the regulator valve being supplied to the first hydraulic chamber of each of the hydraulic servos and the hydraulic pressure from the ratio control valve being supplied to the second hydraulic chamber of each of the hydraulic servos. In this arrangement the servo switching valve switches the communication of the ratio control valve between the two second hydraulic chambers. Since hydraulic pressures are continuously supplied to the first hydraulic chambers of both the hydraulic servos and a hydraulic pressure supplied to the second hydraulic chamber is switched between the hydraulic servos, switching between the Low mode and High mode is easy and secure.

The regulator valve and the ratio control valve may be interposed between the oil pump and the servo switching valve. When the regulator valve and the ratio control valve are disposed downstream of the servo switching valve, the number of valves must be increased or the function of a single valve must be increased. However, when the regulator valve and the ratio control valve are interposed between the oil pump and the switching valve, no such increase is needed and the arrangement can be simplified.

In one preferred embodiment, the control means has first and second regulator valves for adjusting the hydraulic pressure from the oil pump to suitable hydraulic control pressures. The first and second regulator valves each communicate with a different one of the first and second hydraulic servos and the switching valve reverses the communication of the first and second regulator valves with the first and second hydraulic servos as shown in, for example, FIG. 9 to FIG. 13 and FIG. 15. Since the two regulator valves receive different hydraulic pressures, and the supply of the regulated hydraulic pressures is switched between the hydraulic servos, as between forward travel and reverse travel, the Low mode and High mode can be securely and easily switched by reversing the axial forces between the pulleys. The first and second regulator valves may be interposed between the oil pump and the servo switching valve. In this manner, the arrangement can be simplified without the need for an increase of the number of valves or an increase in the functions of a single valve.

An optional relief valve reduces the hydraulic pressure of the hydraulic servo on which a high hydraulic pressure had been acting to lower than the hydraulic pressure of the hydraulic servo on which the lower hydraulic pressure had been acting, when it is determined that the vehicle is coasting. Since the hydraulic pressure of the hydraulic servo on which a high hydraulic pressure acts is lowered by the relief valve, axial forces acting on the pulleys are changed so as to coincide with the direction of torque transmission, even when coasting in which the torque transmitting direction is reversed and thus, the coasting state can be securely maintained.

Detecting means is provided for detecting the pulley ratio of the belt type continuously variable transmission unit, and a determining means determines whether or not a switching by the Low-High shifting means is needed. The determining means determines the time of shifting between the Low mode and the High mode on the basis of signals from the detecting means for the detected pulley ratio. In this case, the determination is automatically performed in a precise manner. Therefore the Low mode and the High mode can be automatically and precisely switched and the axial forces operating on the pulleys can be reversed.

In a preferred embodiment, when the first clutch ($C_L$) is engaged, the input shaft is coupled with the first pulley and the first rotary element, so that the direction in which torque transmitted through the input shaft from the first pulley is opposite to the direction in which torque is transmitted through the input shaft of the first rotary element, as shown in, for example, FIG. 1 and FIG. 24. Torque circulation thus is through the planetary gear unit.

If the Low-High shifting means is in the Low (L) mode wherein the first clutch ($C_L$) is engaged, rotation of the input shaft is transmitted to the second rotary element (e.g., sun gear) through the belt type continuously variable transmission unit, with its speed changed therein and to the first rotary element (e.g., carrier) of the planetary gear through the first clutch ($C_L$). Then the rotations transmitted through these different paths are combined together and the combined torque is output at the output shaft.

If the Low-High shifting means is in the High (H) mode wherein the second clutch ($C_H$) is engaged, rotation of the input shaft is directly transmitted to the output shaft via the belt type continuously variable transmission and second clutch ($CH_H$).

The axial force on the first or second pulley is changed by the axial force actuating means, under control by the control means, in accordance with Low mode or the High mode as set by the Low-High shifting means. Consequently, the pulley ratio of the belt type continuously variable transmission unit is changed in a predetermined manner.

The direction of transmission of torque by the belt type continuously variable transmission unit is switched by the Low-High shifting means. As the Low-High shifting means shifts the mode, the switching means reverses the relative magnitudes of axial forces on the first and second pulleys so as to correspond to the direction of transmission of torque in the belt type continuously variable transmission.

The relative magnitudes of the axial forces operating on the two pulleys are reversed by the switching means with a shifting of the mode by the Low-High shifting means, so that the reversed direction of transmitting torque corresponds to the reversed axial force relationship between the pulleys of the belt continuously transmission. Therefore, the shifting between the Low mode and the High mode can be conducted quickly in a proper manner.

BRIEF DESCRIPTION OF THE DRAWINGS

FIG. 8 is a table of operations of the hydraulic control unit of FIG. 5;

FIG. 13 is a table of the operations of the hydraulic control unit of FIG. 10;

DESCRIPTION OF PREFERRED EMBODIMENTS

Embodiments of the present invention will be described below with reference to the drawings.

Figures 1A, 1B:
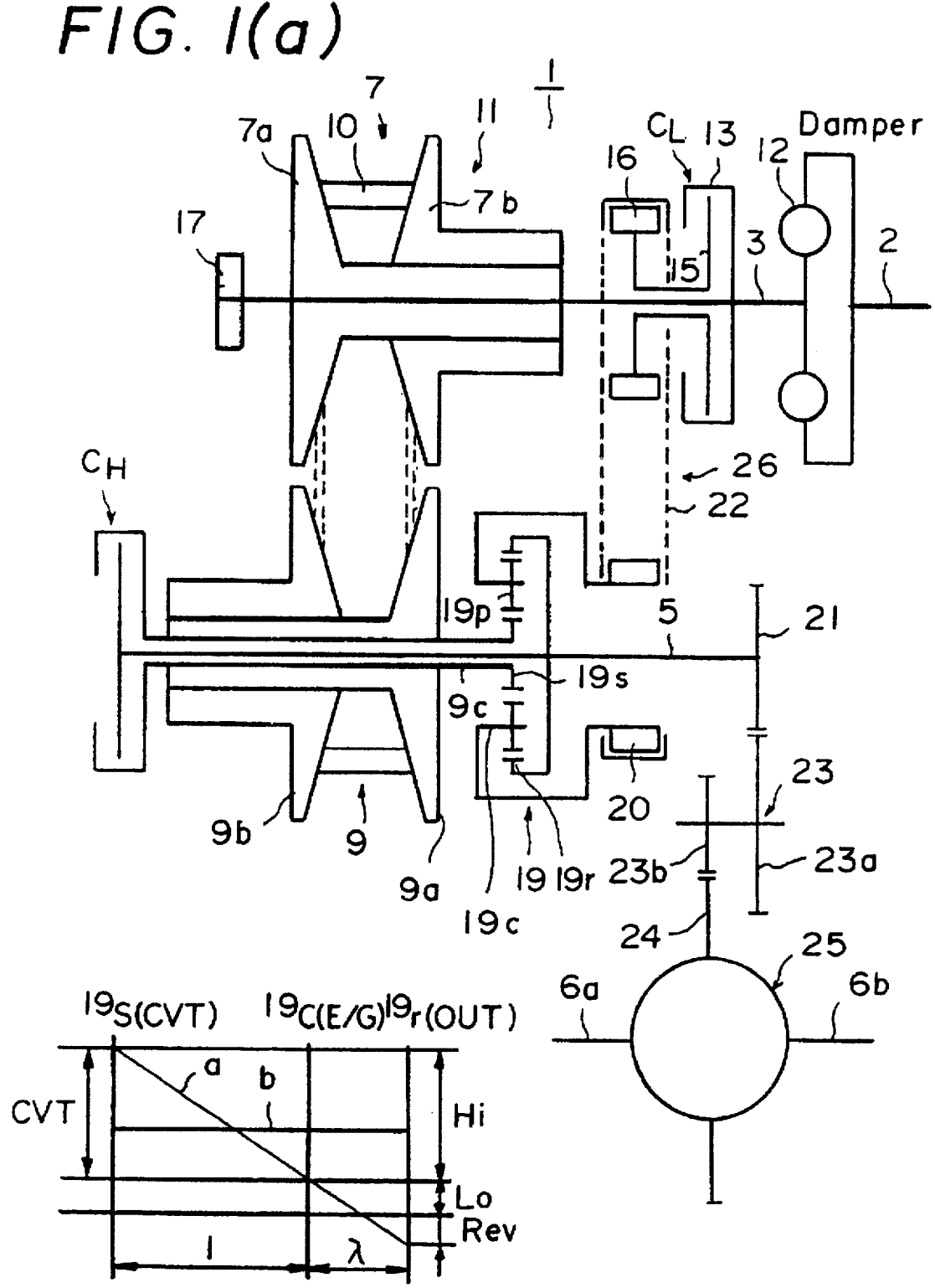
FIG. 1(a) is a skeletal diagram of an embodiment of a continuously variable transmission system according to the present invention.
FIG. 1(b) is a speed graph for the embodiment of FIG. 1.

As shown in FIG. 1(a), a vehicle-mounted automatic continuously variable transmission 1 has a first shaft 3 aligned with an engine crank shaft 2, a second shaft 5 and a third shaft 6 (a, b) aligned with a front wheel shaft. A primary pulley 7 is supported by the input shaft 3, a secondary pulley 9 is supported by the second shaft 5 and a belt 10 is trained around these two pulleys 7, 9 to provide a belt type continuously variable transmission unit 11.

The first shaft 3 is coupled with the engine crank shaft 2 through a damper 12 to form, in combination, an input shaft. The input side member 13 of a low clutch $C_L$ is fixed to the input shaft 3 and the output side member 15 of the low clutch $C_L$ is rotatably supported by the input shaft 3. A primary side sprocket 16, constituting the power transmission means, is integrally coupled with the output side member 15. In addition, the stationary sheave 7a of the primary pulley 7 is fixed to the input shaft 3, an oil pump 17 is coupled to the distal end of the input shaft 3 and a movable sheave 7b is slidably supported on the fixed sheave 7a.

The secondary pulley 9 is rotatably supported by the second shaft 5 and has a stationary sheave 9a, a movable sheave 9b slidably supported by the stationary sheave and a secondary shaft 9c integrally coupled with the stationary sheave. Further, a high clutch $C_H$ is interposed between the second shaft 5 and the secondary shaft 9c, a planetary gear set 19 is mounted on the second shaft 5 and a secondary side sprocket 20 is rotatably supported by the output shaft 5. The output shaft 5 has an output gear 21 fixed at a distal end thereof.

The planetary gear set 19 has a sun gear 19s, a ring gear 19r and a carrier 19c rotatably supporting pinions 19p, each meshed with both the sun gear and ring gear. The sun gear 19s is coupled with the secondary shaft 9c to serve as a second rotary element, the ring gear 19r is coupled with the output shaft 5 to serve as a third rotary element and the carrier 19c is coupled with the secondary side sprocket 20 to serve as a first rotary element. Further, an endless drive member 22, such as a silent chain, roller chain, timing belt or the like, is trained around the primary side and secondary side sprockets 16, 20.

The gear 21 fixed to the output shaft 5 is meshed with the large gear 23a of a speed reduction gear unit 23 and the small gear 23b of the unit is meshed with the ring gear 24 of a differential gear unit 25 which outputs a differential rotation to right and left axle shafts 6a, 6b constituting the third shaft.

Next, operation of the power transmission mechanism of the continuously variable transmission system 1 will be described with reference to FIG. 1(a), FIG. 1(b), FIG. 1(c), FIG. 2 and FIG. 3. The rotation of the engine crank shaft 2 is transmitted to the input shaft 3 through the damper 12. In a low mode in which the low clutch $C_L$ is connected and the high clutch $C_H$ is disconnected, the rotation of the input shaft 3 is transmitted to the primary pulley 7 as well as to the carrier 19c of the planetary gear set 19 through the power transmission unit 26 composed of the primary side sprocket 16, training member 22 and secondary side sprocket 20. The effective diameter of the primary pulley 7 is continuously varied so that the pulley ratio of the primary and secondary pulleys is properly adjusted, as regulated by an axial force actuating means such as a hydraulic servo or the like. The rotation of the primary pulley 7 is transmitted to the secondary pulley 9 and further the speed-changed rotation of the pulley 9 is transmitted to the sun gear 19s of the planetary gear set 19.

As shown in the speed graph of FIG. 1(b), the carrier 19c, to which torque is transmitted without change in speed through the power transmission unit 26, acts as a reaction element in the planetary gear set 19 and a continuously variable rotation is transmitted from the belt type continuously variable transmission (hereinafter, referred to as "CVT") unit 11 to the sun gear 19s, and the rotation input at the carrier and that input at sun gear are combined and transmitted to the output shaft 5 through the ring gear 19r. Since the output shaft 5 is coupled to the ring gear 19r which is a rotary element other than a reaction element, torque circulation is produced within the planetary gear set 19 with the sun gear 19s and the carrier 19c rotating in the same direction. As a result, rotation of the output shaft 5 is switched between forward (Lo) and reverse (Rev) through a zero rotation state. That is, when the output shaft 5 is rotated in the forward (advancing) direction with torque circulation, the belt type continuously variable transmission unit 11 transmits torque from the secondary pulley 9 to the primary pulley 7 as shown in FIG. 1(c), whereas when the output shaft 5 is rotated in the backward (reverse) direction, the transmission unit 11 transmits torque from the primary pulley 7 to the secondary pulley 9.

Figure 1C:
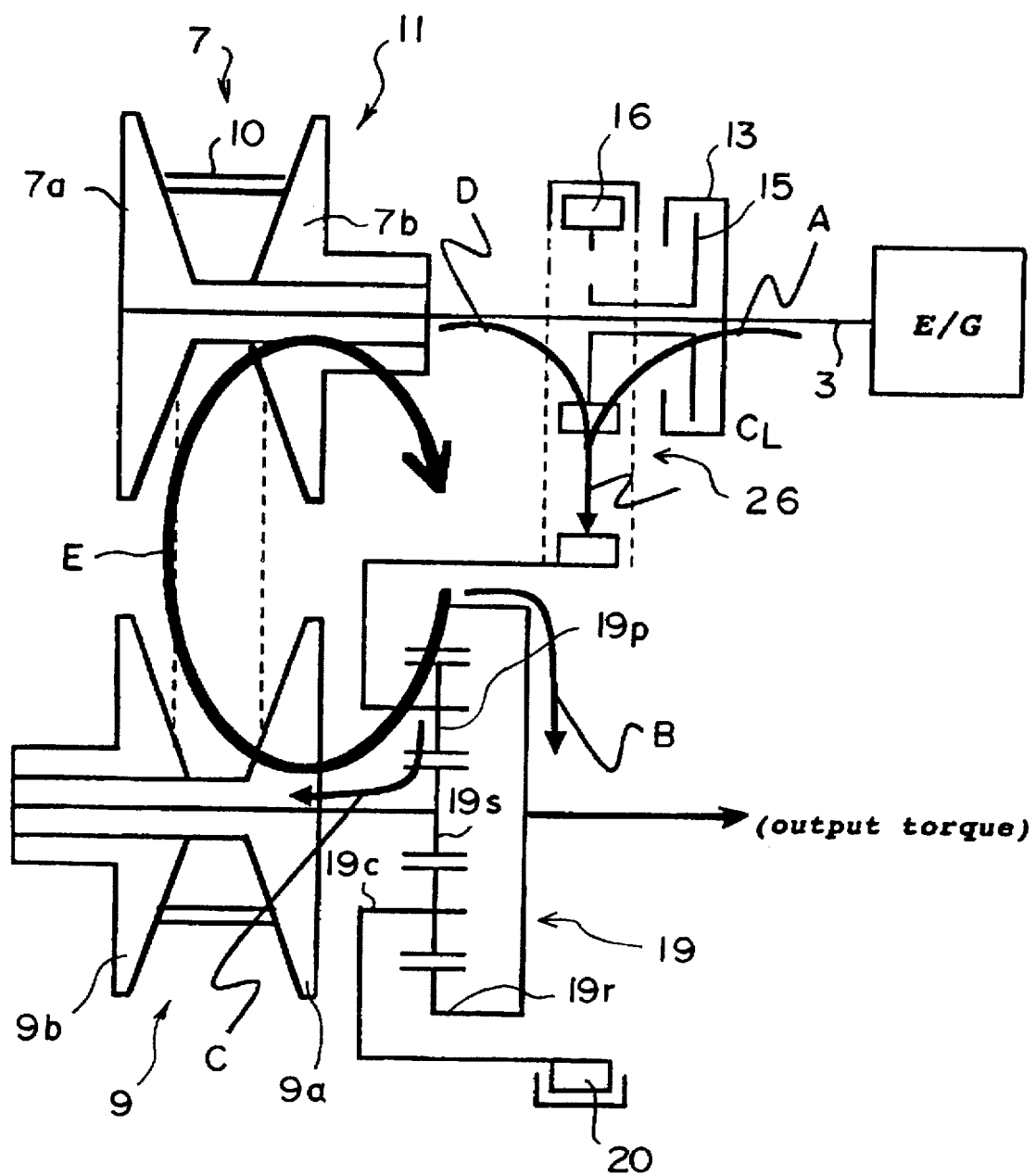
FIG. 1(c) shows torque circulation within the embodiment of FIG. 1(a) in forward.

FIG. 1(c) shows torque circulation through the belt type continuously variable transmission unit (CVT) 11 with the output shaft 5 rotating in the aforementioned forward direction. In this state, torque from engine E/G is output through power transmission unit 26 to the first rotary element (in this embodiment carrier 19c) as indicated by arrow "A". A planetary gear unit 19 outputs a portion of that engine torque as indicated by arrow "B" and recirculates a second portion of the input torque back through the CVT 11 as indicated by arrow "C". That portion of the torque routed back to CVT 11 is returned to the first rotary element as indicated by arrow "D". In this manner, a loop of torque circulating through the CVT is established as indicated by arrow "E". In a conventional CVT, the power transmission path, in which engine torque is transmitted to an output shaft, is via a single path, i.e. through the V-belt of the CVT. In contrast, in the torque-circulation-type-CVT of the present invention two torque transmission paths are established, one path through the CVT unit 11 and planetary gear unit 19 and a second through the power transmission unit 26 and the planetary gear unit 19. The relative amounts of torque transmitted through these two paths is changed by changing the pulley ratio of the CVT. It should be noted that the transmission system of the present invention dispenses with the conventional fluid transmission unit, e.g. torque converter, or electromagnetic clutch. Further, the transmission system of the present invention does not have separate clutches for establishing forward and reverse—note that the clutch $C_L$ is engaged in both forward and reverse.

In a high mode in which the low clutch $C_L$ is disconnected and the high clutch $C_H$ is connected, since power transmission to the planetary gear set 19 through the power transmission unit 26 is shut off, the planetary gear set 19 is rotated integrally with the high clutch $C_H$ by engagement therewith. Consequently, the rotation of the input shaft 3 is entirely transmitted to the output shaft 5 through the belt type CVT unit 11 and the high clutch $C_H$. That is, the CVT unit 11 transmits all power from the primary pulley 7 to the secondary pulley 9. Further, the rotation of the output shaft 5 is transmitted to the differential gear unit 25 through the output gear 21 and speed reduction gear unit 23 and is further transmitted to the right and left front wheels through the right and left axle shafts 6a, 6b.

Figure 2:
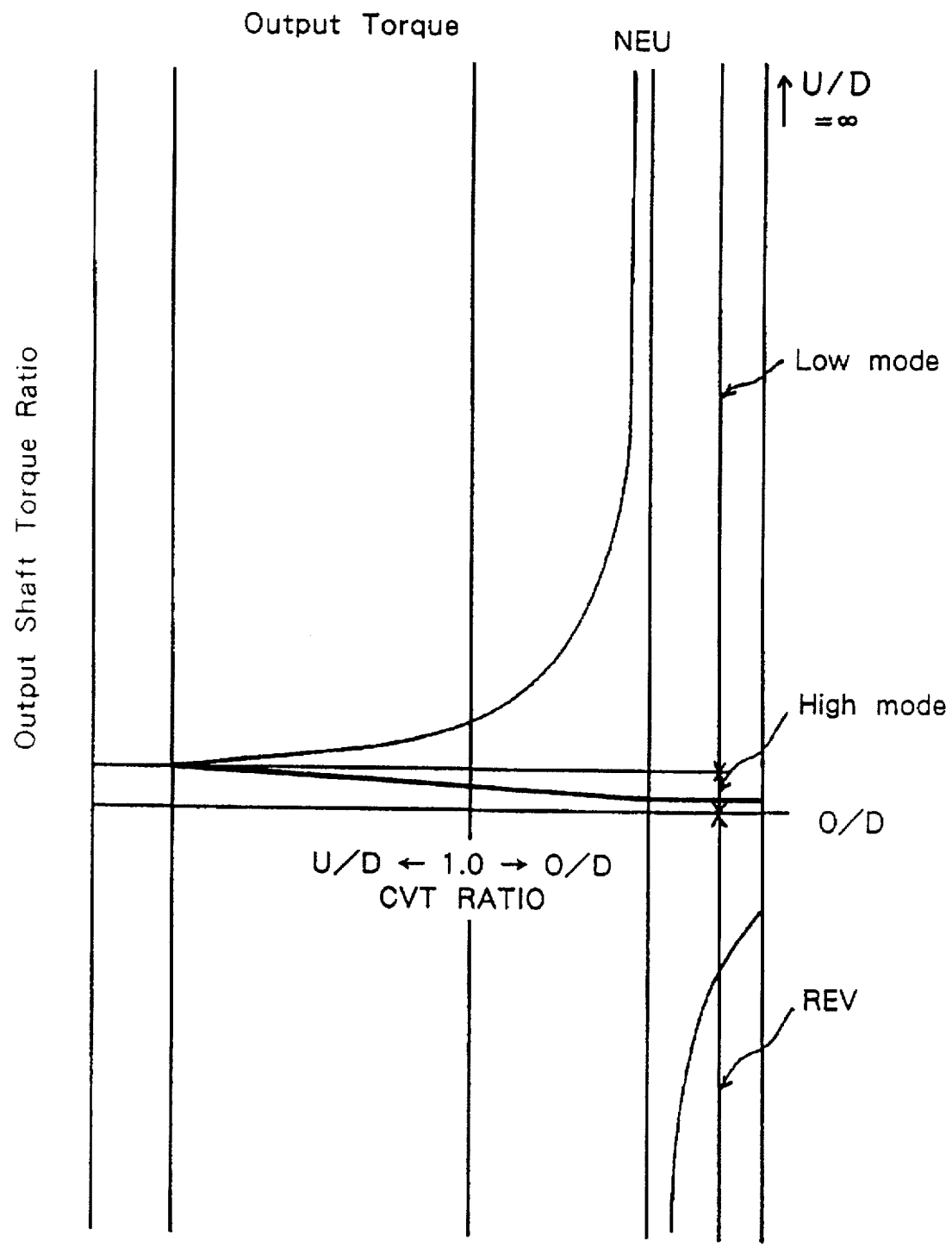
FIG. 2 is a graph of output shaft torque ratio versus pulley ratio of a belt type continuously variable transmission (CVT) unit of the continuously variable transmission system.
Figure 3:
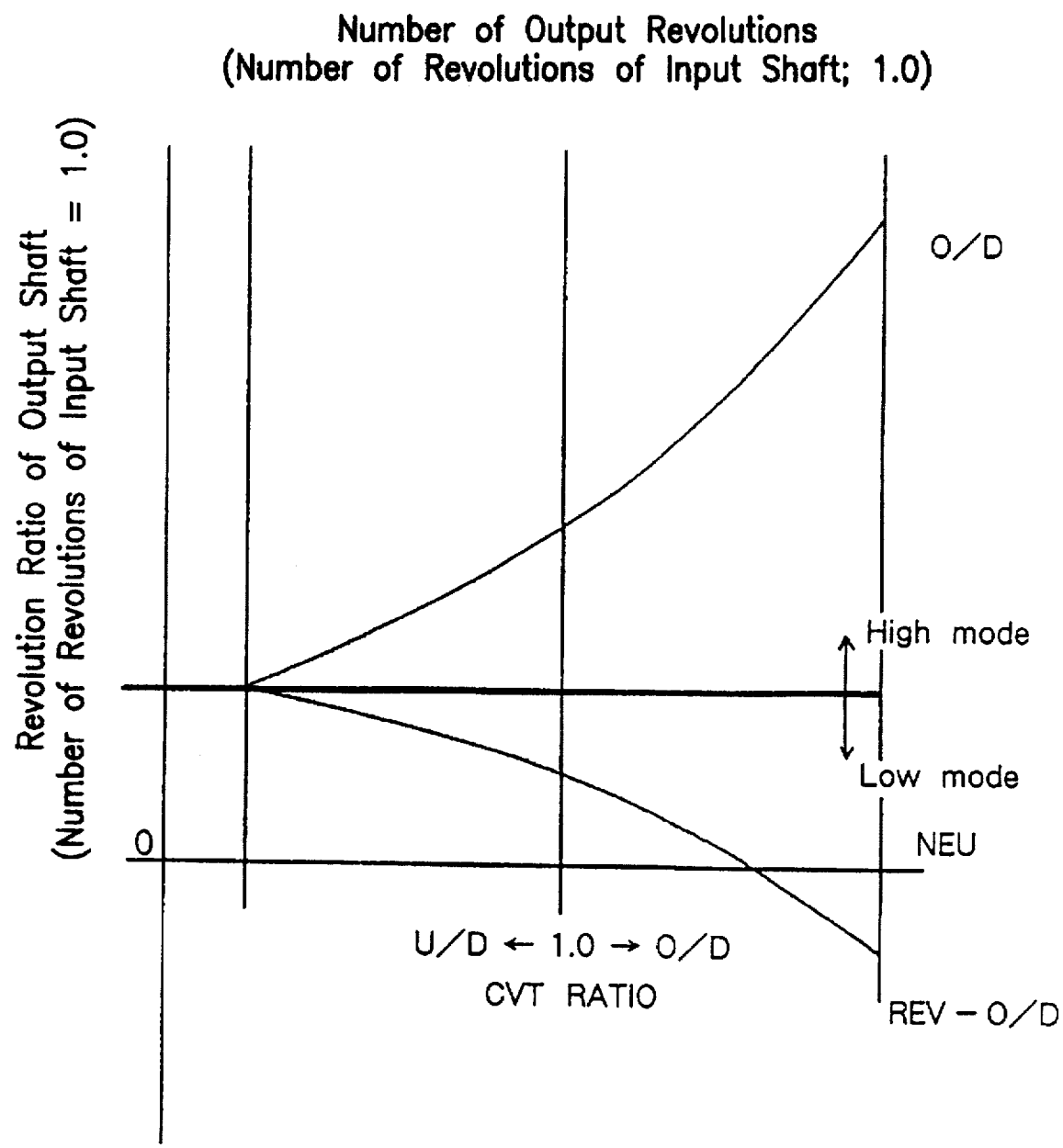
FIG. 3 is a graph of output shaft torque ratio versus torque ratio of the CVT unit.

As shown in the speed graph of FIG. 1(b), the graph of output torque of FIG. 2 and the graph of output r.p.m. of FIG. 3, since the sun gear 19s is at its maximum speed of rotation when the type CVT unit 11 is at the overdrive limit in a speed increasing direction (at the position a in the graph of FIG. 1(b)) in the low mode, the ring gear 19r is rotated in a reverse direction with respect to the carrier 19c having a constant r.p.m. and the reverse rotation (REV) is transmitted to the output shaft 5. When the CVT unit 11 is shifted in a speed reducing (U/D) direction, the r.p.m. of the reverse rotation is reduced, so that a neutral position (NEU) where the r.p.m. of the output shaft 5 is zero is reached at a predetermined pulley ratio determined by the gear ratio of the planetary gear 19 and the power transmission unit 26. When the CVT unit 11 is further shifted in the speed reducing direction, since the ring gear 19r is switched to a forward rotating direction, the forward rotation, i.e. the rotation in a forward traveling direction, is transmitted to the output shaft 5. At this time, as is apparent from FIG. 2, the torque of the second shaft 5 goes to infinity in the vicinity of the neutral position NEU.

When the CVT unit 11 reaches the end limit of the speed reducing direction (U/D), the high clutch $C_H$ is connected and the operation mode is switched to the high mode. In the high mode, since the rotation output from the CVT unit 11 is transmitted to the output shaft 5 as is, a parallel line is obtained as shown by b in the speed graph of FIG. 1(b). Thereafter, as the CVT unit 11 is shifted in a speed increasing (O/D) direction, the rotation of the output shaft 5 is also shifted in the speed increasing direction and the amount of transmitted torque is reduced accordingly. Note that λ in FIG. 1(b) represents the ratio (Zs/Zr) of the number of teeth Zs of the sun gear to the number of teeth of the ring gear Zr.

Next, an embodiment of a hydraulic control mechanism of the continuously variable transmission according to the present invention will be described.

Figure 4:
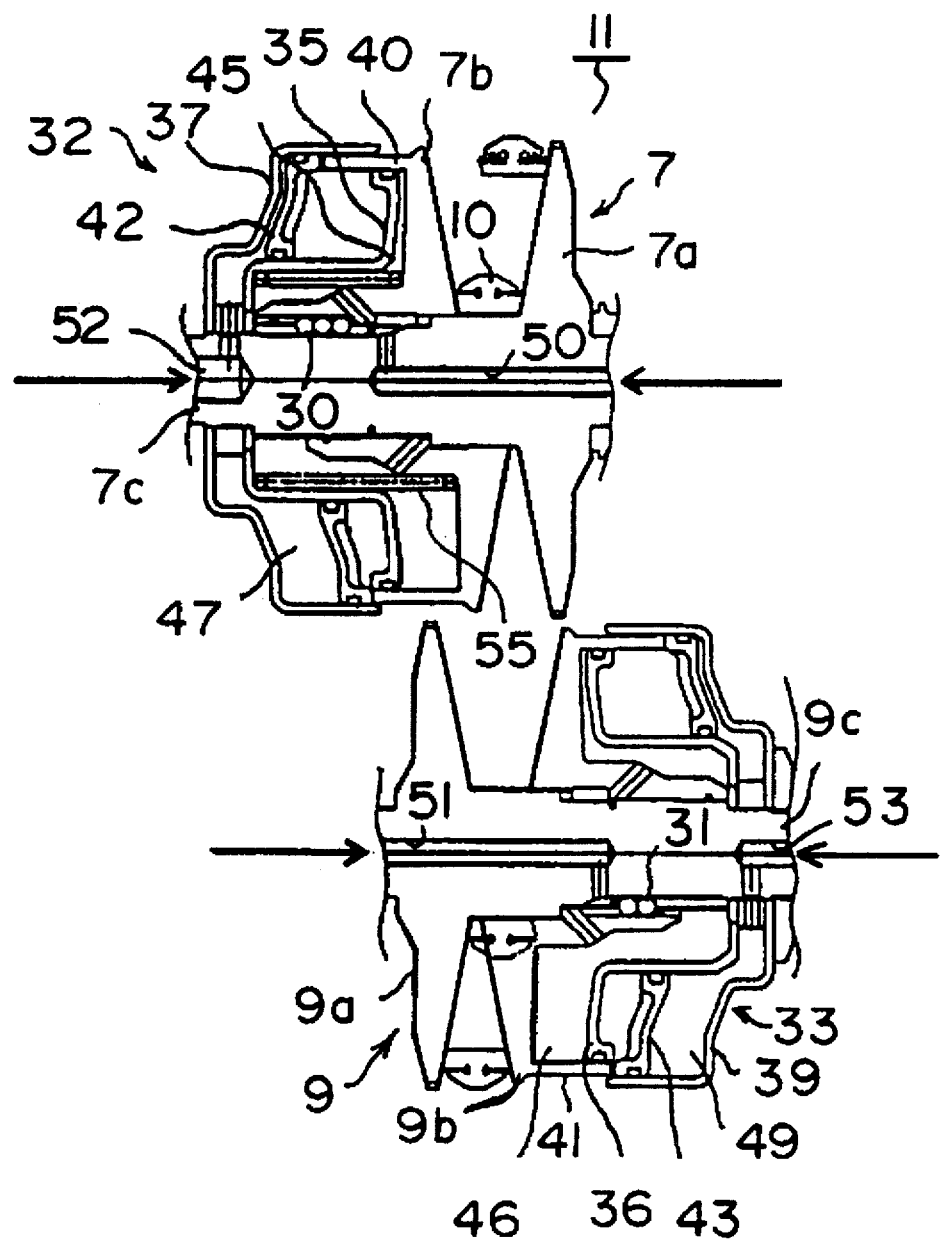
FIG. 4 is a cross-sectional view showing double chamber type hydraulic servos applying axial forces to primary and secondary pulleys.

As seen in FIG. 4, the movable sheaves 7b, 9b are slidably supported by the bosses 7c, 9c of the stationary sheaves 7a, 9a through ball splines 30, 31. Hydraulic servos 32, 33 bear against the back surfaces of these movable sheaves 9b, 9b and constitute the axial force actuating means for applying axial forces to the pulleys. Both of the hydraulic servos 32, 33 have partition members 35, 36 fixed to the bosses 7c, 9c of the stationary sheaves, cylinder members 37, 39, drum members 40, 41 fixed to the back surfaces of the movable sheaves 7b, 9b and second piston members 42, 43. The partition members 35, 36 are engaged with the drum members 40, 41 in an oil tight state. Likewise, the second piston members 42, 43 are engaged with the cylinder members 37, 39 and the partition members 35, 36 in an oil tight state to thereby form a double piston structure composed of first hydraulic chambers 45, 46 and second hydraulic chambers 47, 49, respectively.

The first hydraulic chambers 45, 46 in the hydraulic servos 32, 33 utilize the back surfaces of the movable sheaves 7b, 9b as piston surfaces, and the piston surfaces have the same effective pressure-receiving area on the primary side as on the secondary side. Further, oil passages 50, 51, 52, 53 are formed in the bosses 7c, 9c of the stationary sheaves 7c, 9c on the primary side and secondary side and communicate with the first hydraulic chambers 45, 46 and second hydraulic chambers 47, 49, respectively. In addition, a preloading spring 55 is disposed under compression in the first hydraulic chamber 45 of the primary side hydraulic servo 32.

Figure 5:
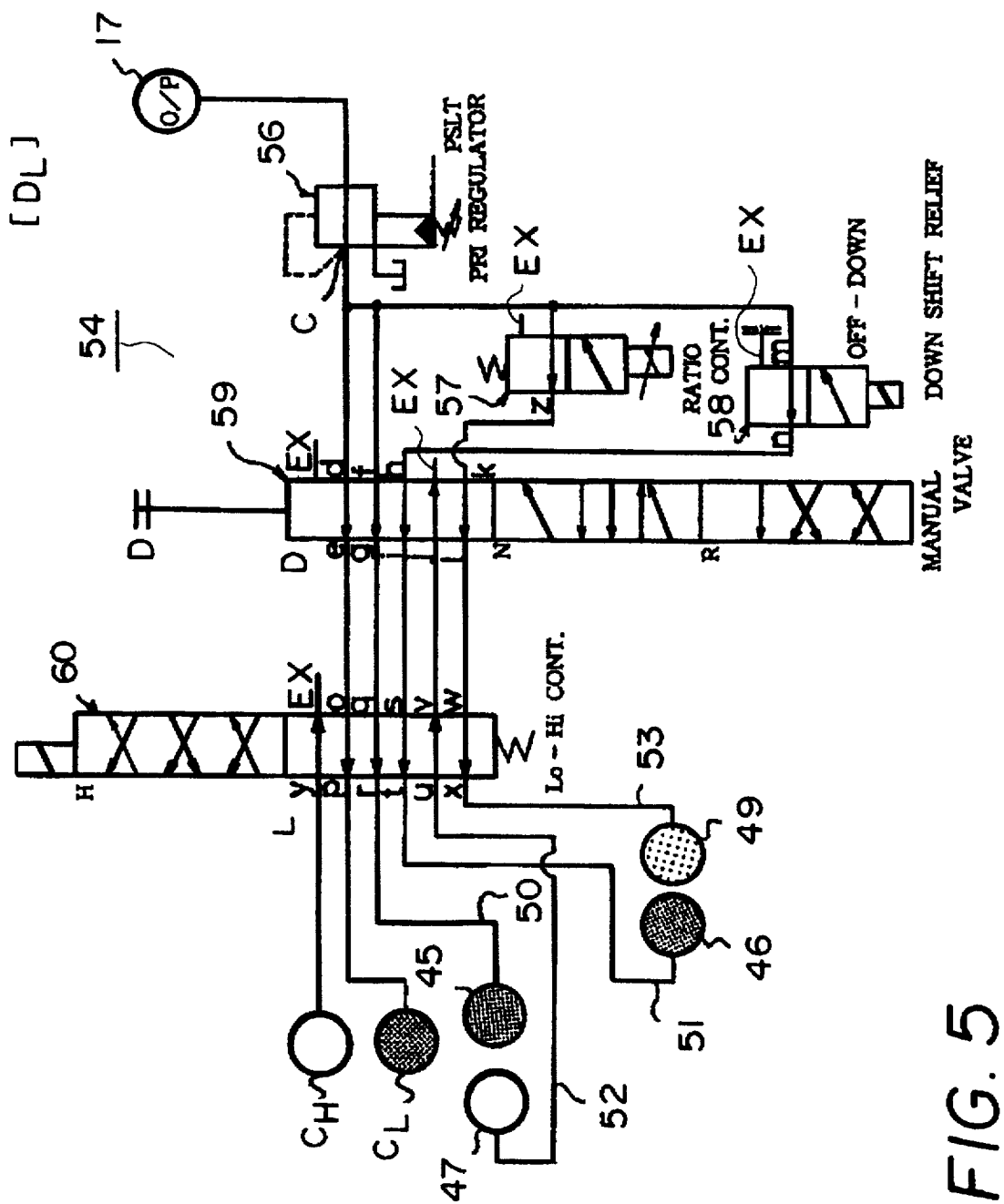
FIG. 5 is a hydraulic circuit diagram of a hydraulic control unit for the continuously variable transmission of FIG. 1 positioned in low (L) mode in D range.

As shown in FIG. 5, the hydraulic control mechanism (means) 54 of this embodiment has a primary regulator valve 56, a ratio control valve 57, a down-shift relief valve 58, a manual valve 59 and a low/high control valve (Low-High shifting means, Low-High shifting valve) 60. Thus, the hydraulic pressure from the oil pump 17 is properly regulated and switched and supplied to the first and second hydraulic chambers 45, 46, 47, 49 of the hydraulic servos 32, 33, the low clutch (hydraulic servo) $C_L$ and high clutch (hydraulic servo) $C_H$.

Next, operation of the above hydraulic control unit 54 will be described with reference to FIG. 4 to FIG. 8.

As shown in FIG. 8, when the low (L) mode is employed in a D range, a predetermined hydraulic pressure is supplied to the hydraulic chamber 45 of the primary side hydraulic servo 32 and a predetermined hydraulic pressure acts on both the first hydraulic chamber 46 and second hydraulic chamber 49 of the secondary side hydraulic servo 33. Further, hydraulic pressure acts on the low clutch $C_L$ to apply it. That is, in the low mode, the manual valve 59 is moved to the D range position shown in FIG. 5 so as to cause a port d to communicate with a port e, a port f with a port g, a port h with a port i and a port k with a port 1 as well as a port j with a drain port Ex. Further, the low/high control valve 60 is at a low (L) position and is switched to cause a port o to communicate with a port p, a port q with a port r, a port s with a port t, a port u with a port v and a port w with a port x as well as a port y with the drain port Ex.

Therefore, the hydraulic pressure from the output port c of the primary regulator valve 56 is supplied to the low clutch hydraulic servo $C_L$, through the ports d and e in the manual valve 59 located at the position for D range (refer to FIG. 5), and further to the ports o and p of the low/high control valve 60 to cause the clutch $C_L$ to be engaged. In addition, the above hydraulic pressure is supplied to the first hydraulic chamber 45 of the primary hydraulic servo 32 through the ports f and g of the manual valve and further the ports q and r of the low/high control valve 60. Except when in a down shift operation, the down-shift relief valve 58 is located at a normal position where the port m communicates with the port n and the hydraulic pressure from the output port c is supplied to the first hydraulic chamber 46 of the secondary hydraulic servo 33 through the ports m and n, the ports h and i of the manual valve 59 and the ports s and t of the low/high control valve 60. The hydraulic pressure from the output port is properly regulated by the ratio control valve 57 so that it becomes a hydraulic pressure corresponding to a target pulley ratio and the hydraulic pressure from the output port z is supplied to the second hydraulic chamber 49 of the hydraulic servo 33 through the ports k and 1 of the manual valve 59 and the ports w and x of the low/high control valve 60. Note, in this state, the high clutch hydraulic servo $C_H$ is in communication with the drain port Ex through the port y of the low/high control valve 60 and therefore is released. Further, the second hydraulic chamber 47 of the primary hydraulic servo 32 communicates with the drain port Ex through the ports u and v of the low/high control valve 60 and the port j of the manual valve 59.

With this operation, the low clutch $C_L$ is connected and the axial force exerted by the secondary side hydraulic servo 33, as a result of hydraulic pressure acting on both the first and second hydraulic chambers 46, 49, is made higher than the axial force exerted by the primary side hydraulic servo 32 in which hydraulic pressure acts on only the first hydraulic chamber 45. Thus, the opening/closing of the above ratio control valve 57 is properly adjusted when the axial forces of both the pulleys 9, 7 correspond to the torque transmitted from the secondary pulley 9 to the primary pulley 7. With this operation, the hydraulic pressure of the second hydraulic chamber 49 of the secondary hydraulic servo 33 is regulated to thereby properly adjust the axial force produced by the hydraulic servo 33, so that the pulley ratio (torque ratio) is properly changed. In this state, the engine torque which is transmitted from the input shaft 3 to the carrier 19c of the planetary gear 19, through the low clutch $C_L$ and power transmission unit 26, is output at the output shaft 5 through the ring gear 19r, while being regulated by the CVT unit 11 through the sun gear 19s based on the above predetermined pulley ratio.

Figure 6:
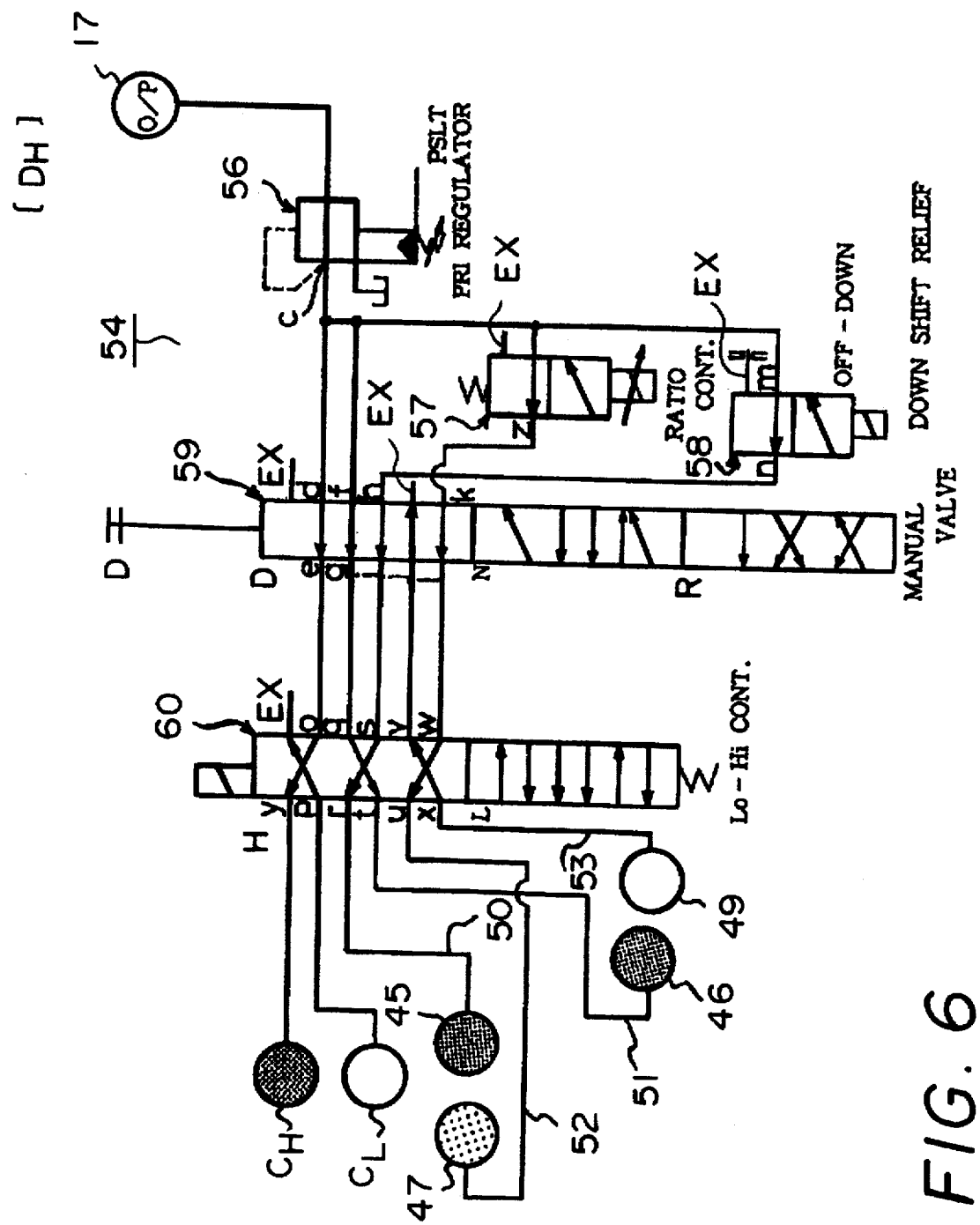
FIG. 6 is a hydraulic circuit diagram similar to FIG. 5 but showing high (H) mode in D range.

In the high (H) mode in the D range, a predetermined hydraulic pressure is supplied to the first and second hydraulic chambers 45, 47 of the primary side hydraulic servo 32 as well as to the first hydraulic chamber 46 of the secondary side hydraulic servo 33 and further to the high clutch hydraulic servo $C_H$ as shown in FIG. 8. That is, in the high (H) mode, although the manual valve 59 is located at the D range position as in the low mode, since the low/high control valve 60 is switched to the high position (H), the port o communicates with the port y, the port q with the port t, the port s with the port r, the port x with the port v and the port w with the port u, respectively, and the port p communicates with the drain port Ex as shown in FIG. 6.

Therefore, the hydraulic pressure output from the primary regulator valve 56 is supplied to the high clutch hydraulic servo $C_H$ through the ports d and e of the manual valve 59 and the ports o and y of the low/high control valve 60, to thereby cause the clutch $C_H$ to engage. Further, the above hydraulic pressure is supplied to the first hydraulic chamber 46 of the secondary hydraulic servo 33 through the ports f and g of the manual valve 59 and the ports q and t of the low/high control valve 60. In addition, the hydraulic pressure is supplied to the first hydraulic chamber 45 of the primary hydraulic servo 32 through the ports m and n of the down-shift relief valve 58, the ports h and i of the manual valve 59 and the ports s and r of the low/high control valve 60 and to the second hydraulic chamber 47 of the primary hydraulic servo 32 through the output port z of the ratio control valve 57 in which the hydraulic pressure is properly regulated, the ports k and 1 of the manual valve 59 and the ports w and u of the low/high control valve 60. Note that the low clutch hydraulic servo $C_L$ is released by coming into communication with the drain port Ex, through the port p of the low/high control valve 60. Further, the second hydraulic chamber 49 of the secondary hydraulic servo 33 communicates with the drain port Ex through the ports x and v of the low/high control valve 60 and the port j of the manual valve 59.

By the above-described operation, the high clutch $C_H$ is connected and the axial force generated by the primary side hydraulic servo 32, which receives a hydraulic pressure in both of its first and second hydraulic chambers 45, 47, is higher than the axial force produced by the secondary side hydraulic servo 33 which receives hydraulic pressure only in its first hydraulic chamber 46.

Thus, above ratio control valve 57 is properly adjusted in the state where the axial forces correspond to the torque transmitted from the primary pulley 7 to the secondary pulley 9. With this operation, the hydraulic pressure of the second hydraulic chamber 47 of the primary hydraulic servo 32 is regulated to thereby adjust the axial force applied by the primary hydraulic servo 32, so that a proper pulley ratio (torque ratio) can be obtained. In this state, the torque transmitted from the engine to the input shaft 3 is properly changed by the CVT unit 11 in transmission from the primary pulley 7 to the secondary pulley 9 and is output at the output shaft 5 through the high clutch $C_H$.

Figure 7:
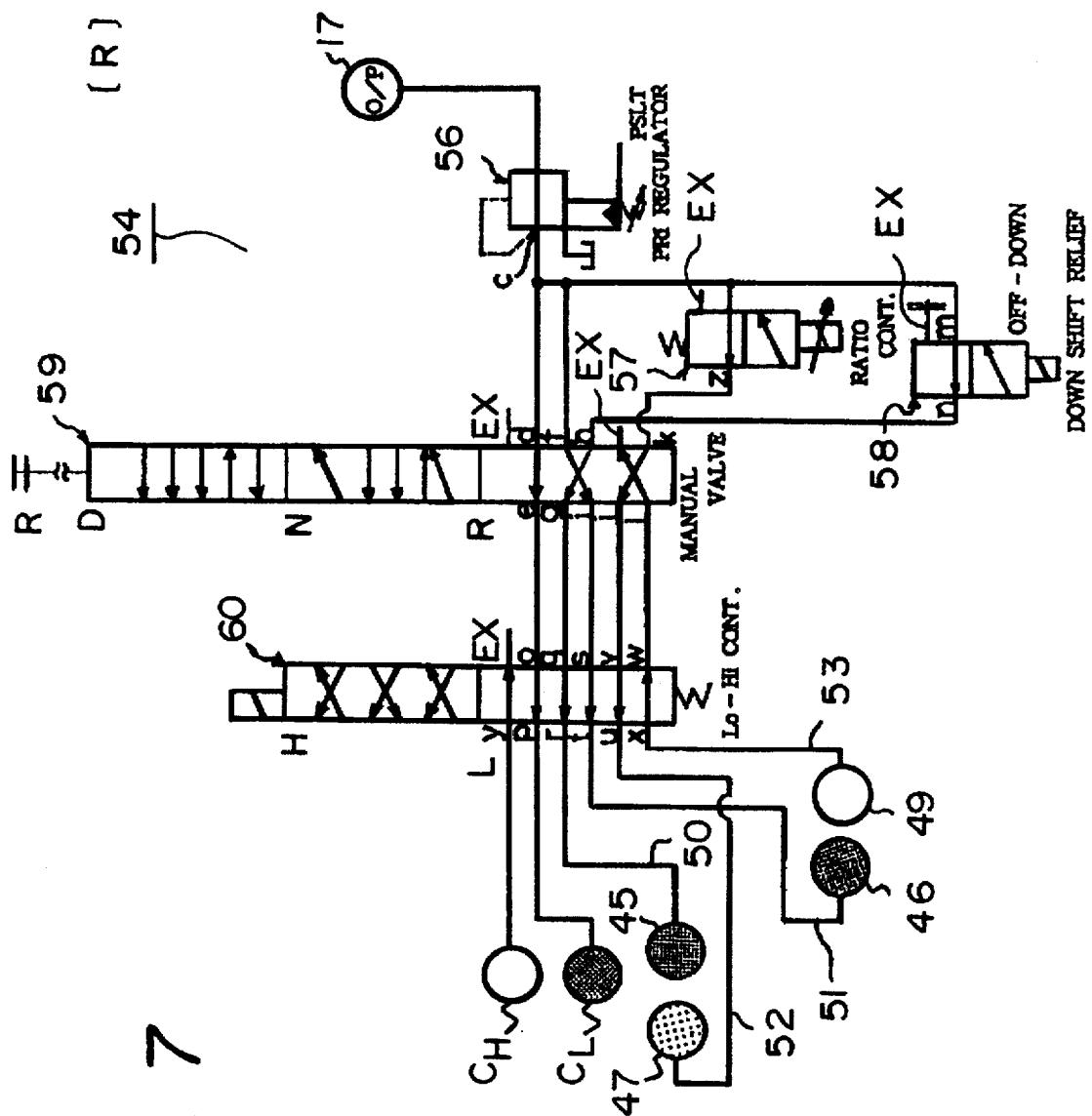
FIG. 7 is a hydraulic circuit diagram similar to FIG. 5 but showing R range.

In reverse range (R), a predetermined hydraulic pressure is supplied to the first and second hydraulic chambers 45, 57 of the primary side hydraulic servo 32 as well as to the first hydraulic chamber 46 of the secondary side hydraulic servo 33 and further to the low clutch hydraulic servo $C_L$ as shown in FIG. 8. That is, in reverse, the manual valve 59 is located at a reverse (R) range position and the low/high control valve 60 is located at the low position (L) as shown in FIG. 7. In this state, the port d communicates with the port e, the port f with the port i and the port k with the port j, respectively, in the manual valve 59 and the port 1 communicates with the drain port Ex. Further, the port o communicates with the port p, the port q with the port r, the port s with the port t, the port v with the port u and the port x with the port w, respectively, in the low/high control valve 60, as in the low (L) mode, and the port y communicates with the drain port Ex.

Therefore, the hydraulic pressure from the output port c of the primary regulator valve 56 is supplied to the low clutch hydraulic servo $C_L$ through the ports d and e of the manual valve 59 and the ports o and p of the low/high control valve 60 and further to the first hydraulic chamber 46 of the secondary hydraulic servo 33 through the ports f and i of the manual valve 59 and the ports s and t of the low/high control valve 60. Further, the above hydraulic pressure is supplied to the first hydraulic chamber 45 of the primary hydraulic servo 32 through the ports m and n of the down-shift relief valve 58, the ports h and g of the manual valve 59 and the ports q and r of the low/high control valve 60. In addition, the hydraulic pressure is properly regulated by the ratio control valve 57 and supplied from the output port z thereof to the second hydraulic chamber 47 of the primary hydraulic servo 32 through the ports k and j of the manual valve 59 and the ports v and u of the low/high control valve 60.

By the above-described operation, the low clutch $C_L$ is connected and the axial force produced by the primary side hydraulic servo 32, which receives hydraulic pressure acting on both of its first and second hydraulic chambers 45, 47, is made higher than the axial force produced by the secondary side hydraulic servo 33 in which hydraulic pressure acts only on its first hydraulic chamber 46. Thus, the axial forces produce a corresponding torque transmission from the primary pulley 7 to the secondary pulley 9 and the hydraulic pressure in the second hydraulic chamber 47 of the primary hydraulic servo 32 is regulated by the ratio control valve 57 to thereby adjust the axial force produced by the hydraulic servo 32, so that a proper pulley ratio can be obtained. In this state, since the pulley ratio of the CVT unit 11 is in a predetermined speed increasing (O/D) state, the engine torque from the input shaft 3 is transmitted to the carrier 19c of the planetary gear 19 through the low clutch $C_L$ and power transmission unit 26 as well as to the sun gear 19s through the CVT unit 11 which transmits torque from the primary pulley 7 to the secondary pulley 9. Both of these torque paths are combined in the planetary gear unit 19 and output from the output shaft 5 through the ring gear 19r as reverse rotation.

In the parking position P and neutral position N of the manual valve 59, both the low clutch $C_L$ and high clutch $C_H$ are released and a predetermined hydraulic pressure is supplied to the first hydraulic chambers 45, 46 of the primary side and secondary side hydraulic servos 32, 33 as shown in FIG. 8. That is, the port f communicates with the port g, the port h with the port i in the manual valve 59 and further the ports e, j, l communicate with the drain port Ex, respectively. In addition, the low/high control valve 60 is kept at the aforesaid low position L.

Therefore, the hydraulic pressure output from the primary regulator valve 56 is supplied to the first hydraulic chamber 45 of the primary hydraulic servo 32 through the ports f and g of the manual valve 59 and the ports q and r of the low/high control valve 60 as well as to the first hydraulic chamber 46 of the secondary hydraulic servo 33 through the ports m and n of the down-shift relief valve 58, the ports h and i of the manual valve 59 and the ports s and t of the low/high control valve 60. Further, the hydraulic pressure of the high clutch hydraulic servo $C_H$ is released through the port y of the low/high control valve 60 and the drain port Ex, the hydraulic pressure of the low clutch hydraulic servo $C_L$ is released through the ports p and o of the low/high control valve 60, the port e of the manual valve 59 and the drain port Ex, the hydraulic pressure of the second hydraulic chamber 47 of the primary hydraulic servo 32 is released through the ports u and v of the low/high control valve 60, the port j of the manual valve 59 and the drain port Ex, and the hydraulic pressure of the second hydraulic chamber 49 of the second hydraulic servo 33 is released through the ports x and w of the low/high control valve 60, the port 1 of the manual valve 59 and the drain port Ex.

By the above-described operation, since both of the low clutch $C_L$ and high clutch $C_H$ are released and the same hydraulic pressure acts on the first hydraulic chambers 45, 46 of the primary hydraulic servo 32 and secondary hydraulic servo 33, approximately the same axial force acts on both the primary and secondary pulleys 7, 9.

Note that since a predetermined hydraulic pressure is supplied from the primary regulator valve 56 to the first hydraulic chambers 45, 46 of both the primary and secondary hydraulic servos 32, 33, respectively, in the D, N and R positions in both the low (L) mode and high (H) mode, a predetermined axial force corresponding to the transmitted torque is applied so that the belt does not slip. Further, since the regulated hydraulic pressure from the ratio control valve 57 is supplied to the second hydraulic chamber 47 or 49 of one of the hydraulic servos 32 and 33, the ratio of the axial forces on the pulleys 7 and 9 is adjusted so that a speed changing operation is executed to obtain a target pulley ratio.

Further, when a down-shift is initiated from a coasting state, the down-shift relief valve 58 is switched to cause the port n to communicate with the drain port Ex. With this operation, the hydraulic pressure supplied to the first hydraulic chamber 45 or 46 of the hydraulic servos 32 and 33, as described above, is discharged through predetermined ports, the port n of the relief valve 58 and the drain port Ex. Further, the hydraulic pressure in the hydraulic servo on which the high hydraulic pressure acts is then changed to become lower than the hydraulic pressure of the other pulley hydraulic servo.

Another embodiment of a control unit will now be described with reference to FIG. 9 to FIG. 13.

Figure 9:
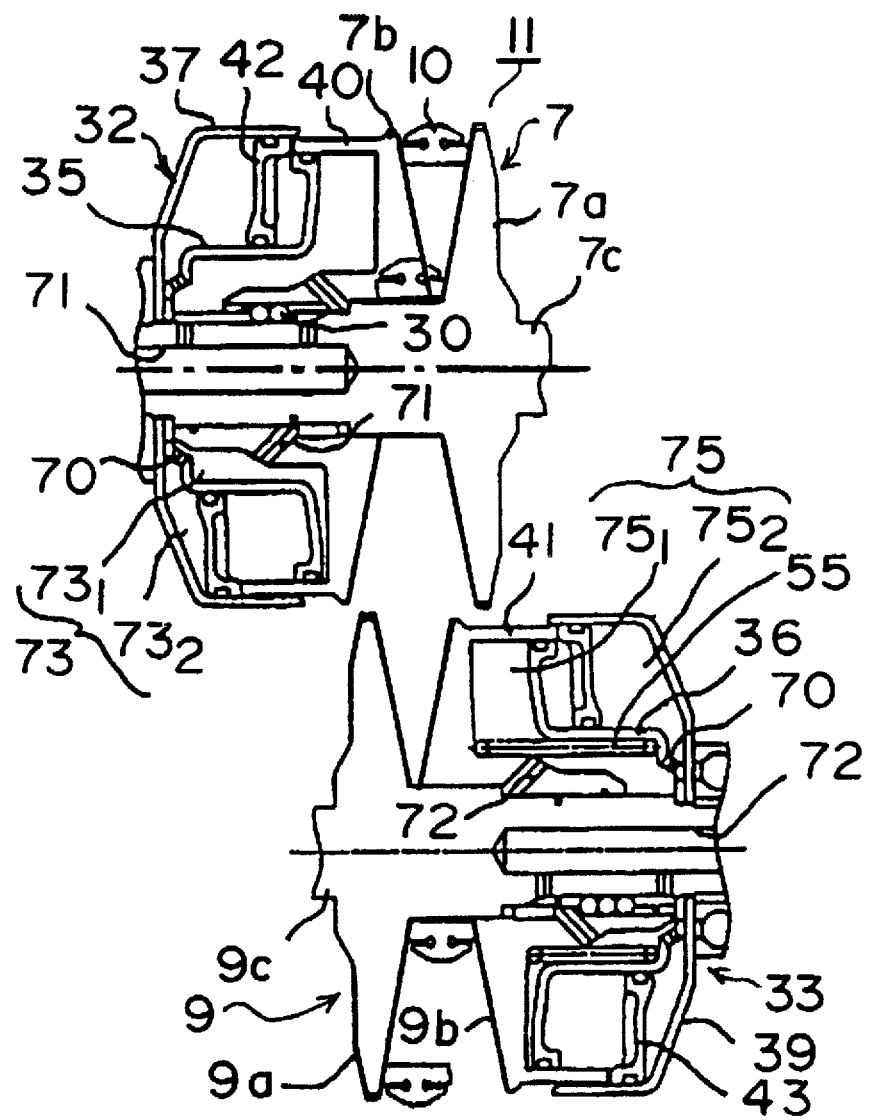
FIG. 9 is a cross-sectional view showing double regulator type hydraulic servos.
Figure 10:
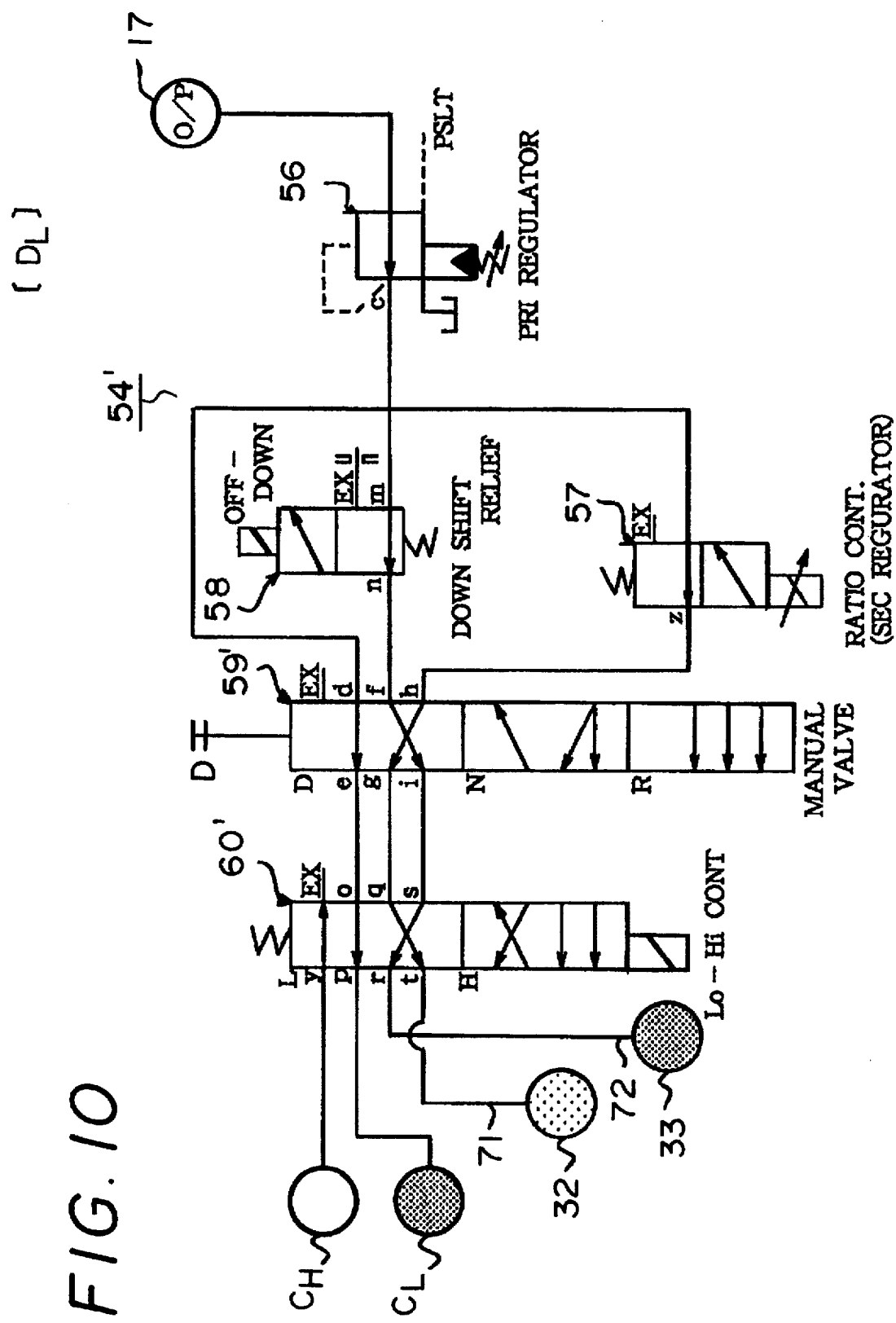
FIG. 10 is a hydraulic circuit diagram of a hydraulic control unit for the double regulator type hydraulic servos of FIG. 9, positioned for low (L) mode in D range.
Figure 11:
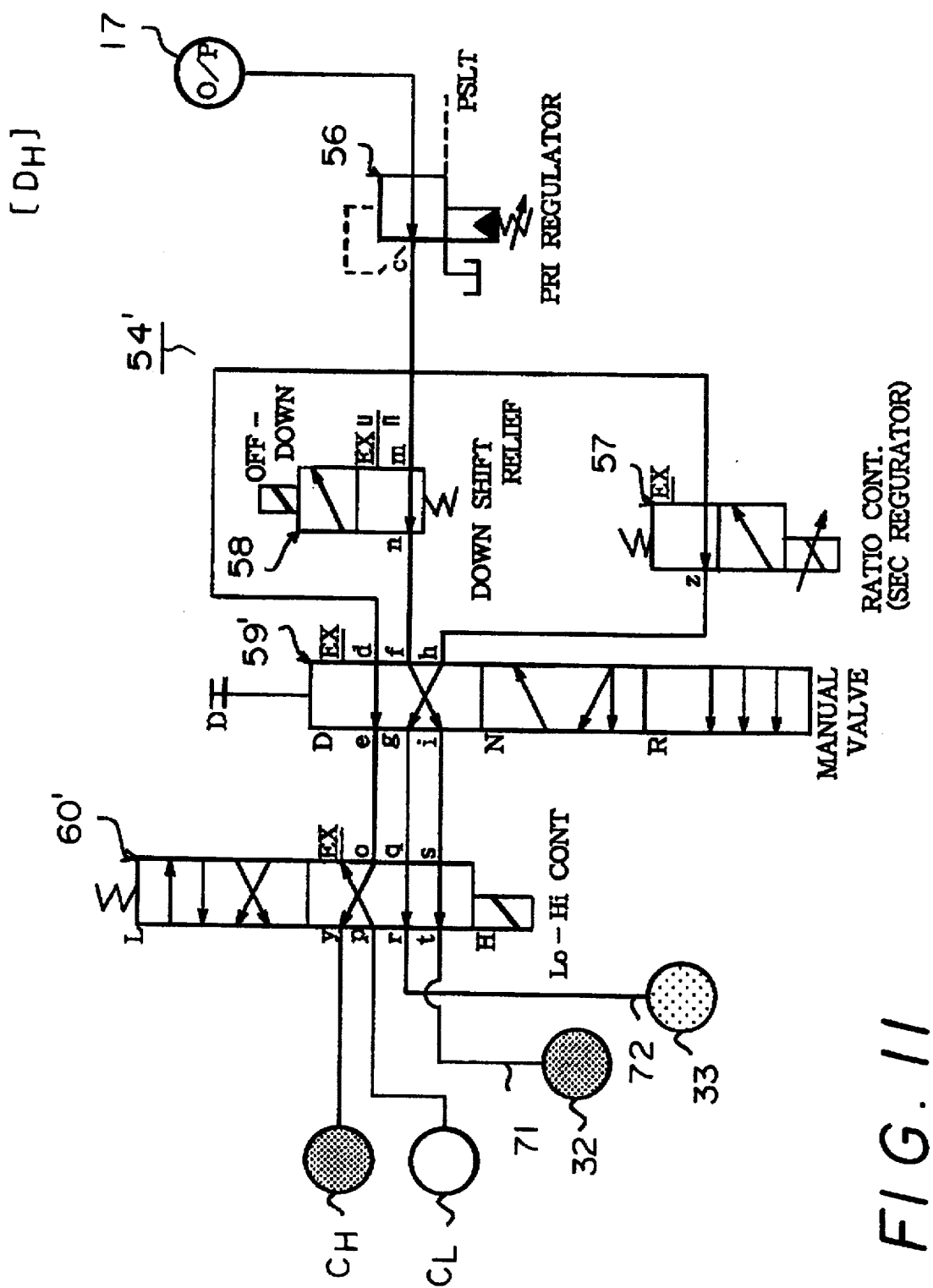
FIG. 11 is the hydraulic circuit diagram of FIG. 10 switched to high (H) mode state in the D range.
Figure 12:
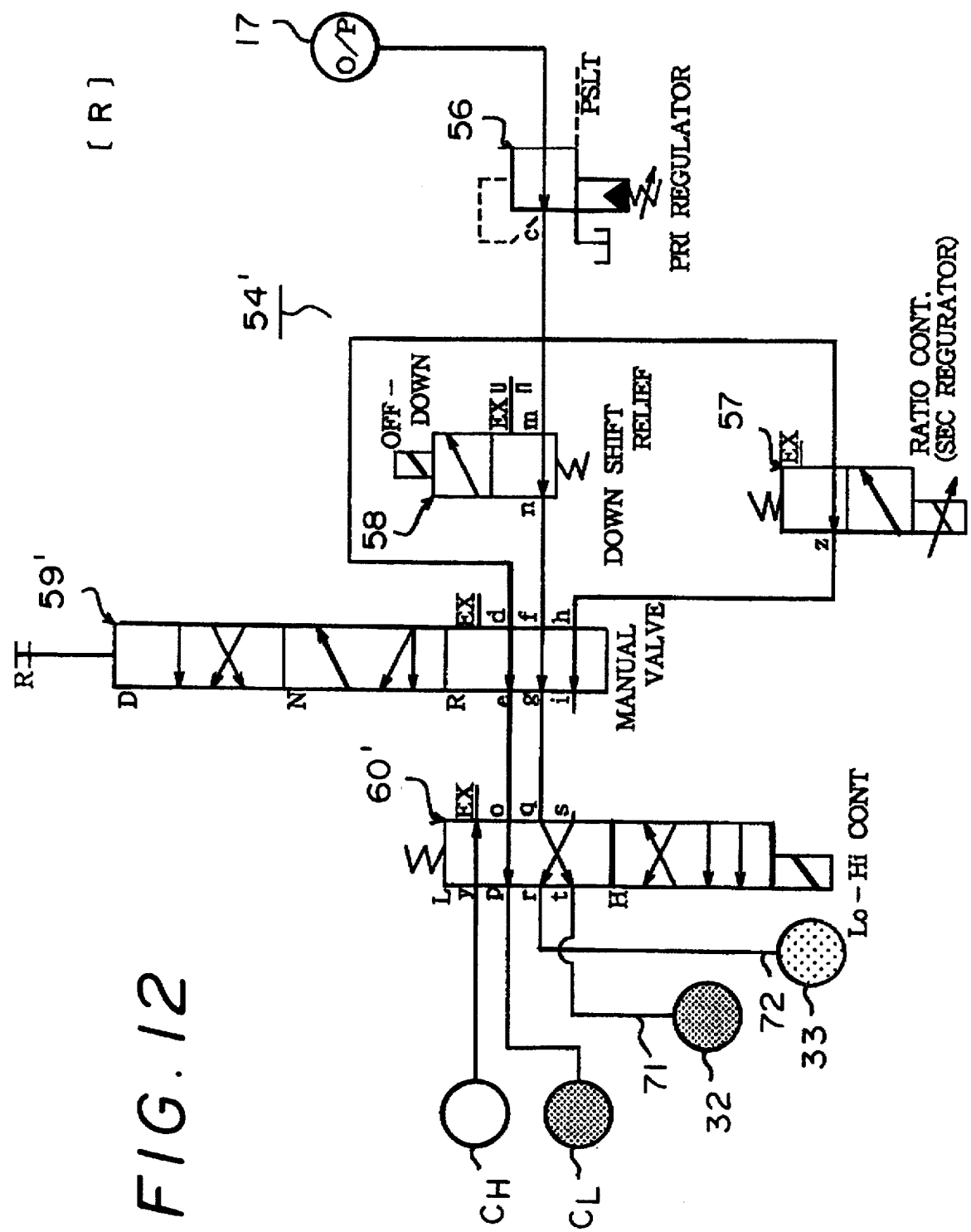
FIG. 12 is the hydraulic circuit diagram of FIG. 10 switched to R range.

Although primary and secondary side hydraulic servos 32, 33 of this embodiment shown in FIG. 9 have first and second hydraulic chambers $73_1$, $75_1$, $73_2$, $75_2$, respectively, similar to those shown in FIG. 4, the servos in this embodiment are different in that holes 70, 70 are formed in the partition members 35, 36 to increase pressure receiving areas in a simple manner. Thus, in this embodiment hydraulic servo actuators 32 and 33 are each composed of substantially single hydraulic chambers (73, 75), supplied with hydraulic pressure from oil passages 71, 72, respectively. The hydraulic chambers 73 and 75 have substantially identical pressure-receiving areas. Further, a preloading spring 55 is disposed under compression within the first hydraulic chamber 75, of the secondary side hydraulic servo 33. As shown in FIG. 10 to FIG. 12, the control mechanism 54' has a primary regulator valve 56, a ratio control valve 57 constituting a secondary regulator valve and a down-shift relief valve 58, all of which are disposed in series from an oil pump 17. The control mechanism 54' further has a manual valve 59' and a low/high control valve 60', each having an oil passage structure different from that of the previously described embodiment. The control mechanism 54' operates as shown in the operation table of FIG. 13.

In the low (L) mode in the D range, a relatively low line pressure ($P_L$-L) is supplied to the hydraulic chamber 73 of the primary hydraulic servo 32 from the ratio control valve 57, a relatively high line pressure ($P_L$-H) is supplied to the hydraulic chamber 75 of the secondary hydraulic servo 33 from the primary regulator valve 56 and a line pressure is supplied to a low clutch hydraulic servo $C_L$, as shown in FIG. 13. That is, since the manual valve '59 is located at the D position, a port d communicates with a port e, a port f with a port i and a port h with a port g, and since the low/high control valve 60' is located at the low (L) position, a port o communicates with a port p, a port q with a port t and a port s with a port r and a port y communicates with a drain port Ex, as shown in FIG. 10.

Therefore, the relatively high line pressure ($P_L$-H) regulated by the primary regulator valve 56 is supplied to the low clutch hydraulic servo $C_L$ through the ports d and e of the manual valve 59' and the ports o and p of the low/high control valve 60' and further to the secondary hydraulic servo 33 through the ports m and n of the down-shift relief valve 58, the ports f and i of the manual valve 59' and the ports s and r of the low/high control valve 60'. Further, the pressure output from the primary regulator valve 56 is further properly regulated by the ratio control valve (secondary regulator valve) 57 and the resulting regulated relatively low line pressure ($P_L$-L) is supplied from the output port z thereof to the primary hydraulic servo 32 through the ports h and g of the manual valve 59' and the ports q and t of the low/high control valve 60'. Note that the hydraulic pressure of a high clutch hydraulic servo $C_H$ is released through the port y and drain port Ex.

By the above-described operation, low clutch $C_L$ is connected and the axial force on secondary pulley 9 exerted by the secondary hydraulic servo 33, on which the relatively high line pressure $P_L$-H acts, is made higher than the axial force on primary pulley 7 exerted by the primary hydraulic servo 32 on which the relatively low line pressure $P_L$-L acts. This state corresponds to the low (L) mode in the D range where torque is transmitted from the secondary pulley 9 to the primary pulley 7. Since the axial force of the primary pulley 7 is adjusted by the regulation of the ratio control valve 57, the pulley ratio (torque ratio) is properly changed.

Further, in the high (H) mode in the D range, the relatively high line pressure $P_L$-H is supplied to the primary hydraulic servo 32 and the relatively low line pressure $P_L$-L is supplied to the secondary hydraulic servo 33 and the line pressure is supplied to the high clutch hydraulic servo $C_H$ as shown in FIG. 13. That is, although the manual valve 59' is maintained at the range position as in the above case, since the low/high control valve 60' is switched to a high (H) position, the port o communicates with the port y and the port q with the port r and the port s with the port t, respectively, and further the port p communicates with the drain port Ex, as shown in FIG. 11.

Therefore, the relatively high regulated pressure (line pressure) $P_L$-H from the primary regulator valve 56 is supplied to the high clutch hydraulic servo $C_H$ through the ports d and e of the manual valve 59' and the ports o and y of the low/high control valve 60' and further to the primary hydraulic servo 32 through the ports m and n of the down-shift relief valve 58, the ports f and i of the manual valve 59' and the ports s and t of the low/high control valve 60'. On the other hand, the relatively low regulated pressure (line pressure) $P_L$-L obtained by further regulating the pressure output from the primary regulator valve 56 is supplied from the output port z thereof to the secondary hydraulic servo 33 through the ports h and g of the manual valve 59' and the ports q and r of the low/high control valve 60' Note that the hydraulic pressure of the low clutch hydraulic servo $C_L$ is released through the port p and drain port Ex.

By the above-described operation, the high clutch $C_H$ is connected and the axial force on the primary pulley 7 exerted by the primary hydraulic servo 32, on which the relatively high line pressure $P_L$-H acts, is made higher than the axial force on the secondary pulley 9 exerted by the secondary hydraulic servo 33, on which the relatively low line pressure $P_L$-L acts. This state corresponds to the high (L) mode where torque is transmitted from the primary pulley 7 to the secondary pulley 9 and, since the axial force of the secondary pulley 9 is adjusted by pressure regulation effected by the ratio control valve 57, the pulley ratio (torque ratio) is properly changed.

In reverse range (R), the relatively high line pressure $P_L$-H acts on the primary hydraulic servo 32 and the relatively low line pressure $P_L$-L acts on the secondary hydraulic servo 33, while the line pressure acts on the low clutch hydraulic servo $C_L$ as shown in FIG. 13. That is, when the manual valve 59 is switched to the reverse (R) range position, the port d communicates with the port e, the port f with the port g and the port h with the port i and further the low/high control valve 60' is held at the aforesaid low (L) position, as shown in FIG. 12.

Therefore, the relatively high regulated pressure (line pressure) $P_L$-H from the primary regulator valve 56 is supplied to the low clutch hydraulic servo $C_L$ through the ports d and e of the manual valve 59' and the ports o and p of the low/high control valve 60' as well as to the primary hydraulic servo 32 through the ports m and n of the down-shift relief valve 58, the ports f and g of the manual valve 59' and the ports q and t of the low/high control valve 60'. On the other hand, the relatively low regulated pressure (line pressure) $P_L$-L from the ratio control valve 57 is supplied to the secondary hydraulic servo 33 through the port h and i of the manual valve 59' and the ports s and r of the low/high control valve 60'. Note that the hydraulic pressure of the high clutch hydraulic servo $C_H$ is discharged from the port y to the drain port Ex.

With the above operation, the low clutch $C_L$ is connected and the relatively high hydraulic pressure $P_L$-H, output from the primary regulator valve 56, acts on the primary hydraulic servo 32 and the relatively low hydraulic pressure $P_L$-L, output from the ratio control valve 57, acts on the secondary hydraulic servo 33. In the reverse (R) range, although torque is transmitted from the primary pulley 7 to the secondary pulley 9 in the CVT unit 11, the axial force of the primary pulley 7 is made higher than that of the secondary pulley 9 in correspondence with the torque transmission and the axial force on the secondary pulley 9 is adjusted by the pressure regulation of the ratio control valve 57 so that the pulley ratio is properly changed.

Further, in neutral (N) and park (P), the relatively low hydraulic pressure $P_L$-L acts on the primary hydraulic servo 32 and the relatively low hydraulic pressure $P_L$-L acts on the secondary hydraulic servo 33 as shown in FIG. 13. That is, since the manual valve 59' is switched to the neutral or park position, the port e communicates with the drain port Ex and the port h communicates with the ports g and i. The low/high control valve 60' is held at the aforesaid low (L) position.

Therefore, the hydraulic pressure from the output port z of the ratio control valve 57 is supplied from the port h of the manual valve 59' to the primary hydraulic servo 32 through the port g and the ports q and t of the low/high control valve '60 as well as to the secondary hydraulic servo 33 through the port i and the ports s and r of the low/high control valve 60'. Further, the hydraulic pressure of the high clutch hydraulic servo $C_H$ is discharged from the port y of the low/high control valve 60' to the drain port Ex and the hydraulic pressure of the low clutch hydraulic servo $C_L$ is discharged through the ports p and o of the low/high control valve 60', the port e of the manual valve 59' and the drain port Ex.

With this operation, both the low and high clutches $C_L$, $C_H$ are shut off and the same hydraulic pressure from the ratio control valve 57 acts on the primary hydraulic servo 32 and secondary hydraulic servo 33 which have identical pressure-receiving areas so that approximately the same axial forces act on both the primary and secondary pulleys 7, 9.

Note that when a down-shift operation is executed, the down-shift relief valve 58 is switched to cause the port n to communicate with the drain port Ex, whereby the hydraulic pressure of the hydraulic servo which had received the higher hydraulic pressure is made lower than the hydraulic pressure on the other pulley hydraulic servo.

Figure 14:
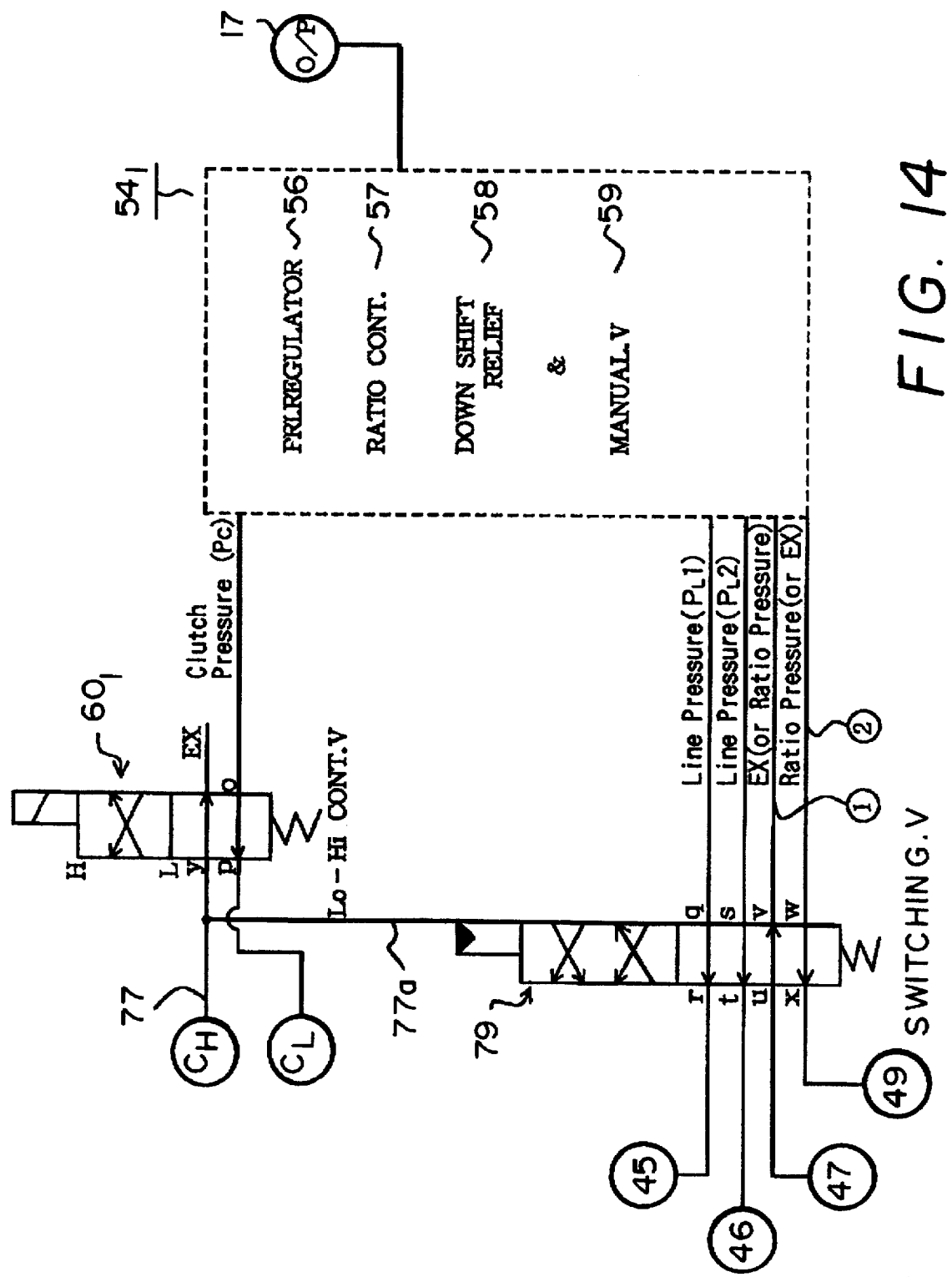
FIG. 14 is a diagram showing a partially modified hydraulic control unit applicable to the double chamber type hydraulic servos of FIG. 4.

Next, a partially modified control mechanism will be described with reference to FIG. 14. The control mechanism $54_1$ is a so-called double chamber type control mechanism having the primary and secondary hydraulic servos 32, 33 shown in FIG. 4. That is, the servos 32, 33 have first and second hydraulic chambers 45, 46, 47, 49. Note that although a primary regulator valve 56, a ratio control valve 57, a down-shift relief valve 58 and a manual valve 59 are similar to those of the embodiments shown in FIG. 5 to FIG. 7, this embodiment differs in that low/high control valve $60_1$ is a simple 2-position-switching solenoid valve with 4 ports.

A pilot oil passage 77a branches from an oil passage 77 communicating with the port y of the low/high control valve $60_1$ and feeds a high clutch servo $C_H$. A switching valve 79 is provided which is switched by a pilot pressure.

In the low (L) mode in the D range, since the low/high control valve $60_1$ is in low position, a port o communicates with a port p and a port y with a drain port Ex. Further, since the switching valve 79 positioned, as illustrated, with the oil passage 77 in communication with the drain port Ex, a port q with a port r, a port s with a port t, a port u with a port v and a port w with a port x. Note that the manual valve 59 is in the D range position so that the ratio pressure from the ratio control valve 57 is introduced into oil passage (2) and an oil passage (1) communicates with the drain port Ex.

Therefore, the clutch pressure Pc from the manual valve 59 is supplied to a low clutch hydraulic servo $C_L$ through the ports o and p of the low/high control valve $60_1$ and the first and second line pressures $P_L1$~$P_L2$ from the manual valve are supplied to the first hydraulic chamber 45 of the primary hydraulic servo 32 and the first hydraulic chamber 46 of the secondary hydraulic servo 33 through the ports q, r, s, t of the switching valve 79. Further, the ratio pressure from the manual valve is supplied to the second hydraulic chamber 49 of the secondary hydraulic servo 33 through the oil passage (2) and the ports w and x of the switching valve 79 and the hydraulic pressure of the second hydraulic chamber 47 of the primary hydraulic servo 32 communicates with the drain port Ex of the manual valve through the ports u and v and the oil passage (1).

In this state, the low clutch $C_L$ is applied and the axial force on the secondary pulley 9 is made higher than that on the primary pulley 7 by the ratio pressure acting on the second hydraulic chamber 49 of the secondary hydraulic servo 33 in accordance with the direction in which torque is transmitted in the CVT unit 11, in the same manner as described above.

Further, in the high (H) mode in the D range, since the low/high control valve $60_1$ is switched to the high (H) position, the port o communicates with the port y and the port p with the drain port Ex. Since the switching valve 79 is switched by the pilot pressure from the oil passage 77a, the clutch pressure Pc is supplied to the oil passage 77 through the ports o and y, the port q communicates with the port t, the port s with the port r, the port x with the port v and the port w with the port u.

Therefore, the clutch pressure Pc is supplied to the high clutch hydraulic servo $C_H$ through the ports o and y of the low/high control valve $60_1$ and the line pressures $P_L1$ and $P_L2$ are supplied to the first hydraulic chamber 46 of the secondary hydraulic servo 33 through the ports q and t of the switching valve 79 and to the first hydraulic chamber 45 of the primary hydraulic servo 32 through the ports s and r. Further, the ratio pressure from the manual valve 59 is supplied to the second hydraulic chamber 47 of the primary hydraulic servo 32 through the oil passage (2) and the ports w and u and the hydraulic pressure of the second hydraulic chamber 49 of the secondary hydraulic servo 33 is discharged from the drain port of the manual valve 59 through the ports x and v and oil passage (1).

In this state, the high clutch $C_H$ is engaged and the axial force on the primary pulley 7 exerted by the primary hydraulic servo 32, in which the ratio pressure acts on the second hydraulic chamber 47, is made higher than that exerted on the secondary pulley 9 in accordance with the direction in which torque is transmitted in the CVT unit 11.

In reverse (R), the manual valve 59 is switched and the low/high control valve $60_1$ is held in the low (L) position as shown in FIG. 7. Therefore, the switching valve 79 is held at the lower position in the drawing. Further, the ratio pressure is supplied to the oil passage (1) by switching the switching valve 79 and the oil passage (2) communicates with the drain port Ex.

Therefore, the clutch pressure Pc is supplied to the low clutch hydraulic servo $C_L$ through the ports o and p and the first and second line pressures are supplied to the first hydraulic chamber 5 of the primary hydraulic servo through the ports q and r as well as to the first hydraulic chamber 46 of the secondary hydraulic servo through the ports s and t. Further, the ratio pressure through the manual valve 59 is supplied to the second hydraulic chamber 47 of the primary hydraulic servo through the oil passage (1) and the ports v and u and the hydraulic pressure of the second hydraulic chamber of the secondary hydraulic servo is discharged from the drain port Ex of the manual valve 59 through the ports x and w and the oil passage (2).

In this state, the low clutch $C_L$ is engaged and the axial force on the primary pulley 7 exerted by the primary hydraulic servo 32, in which the ratio pressure acts on the second hydraulic chamber 47, is made higher than that exerted on the secondary pulley 9 in accordance with the direction in which torque is transmitted in the CVT unit 11.

Figure 15:
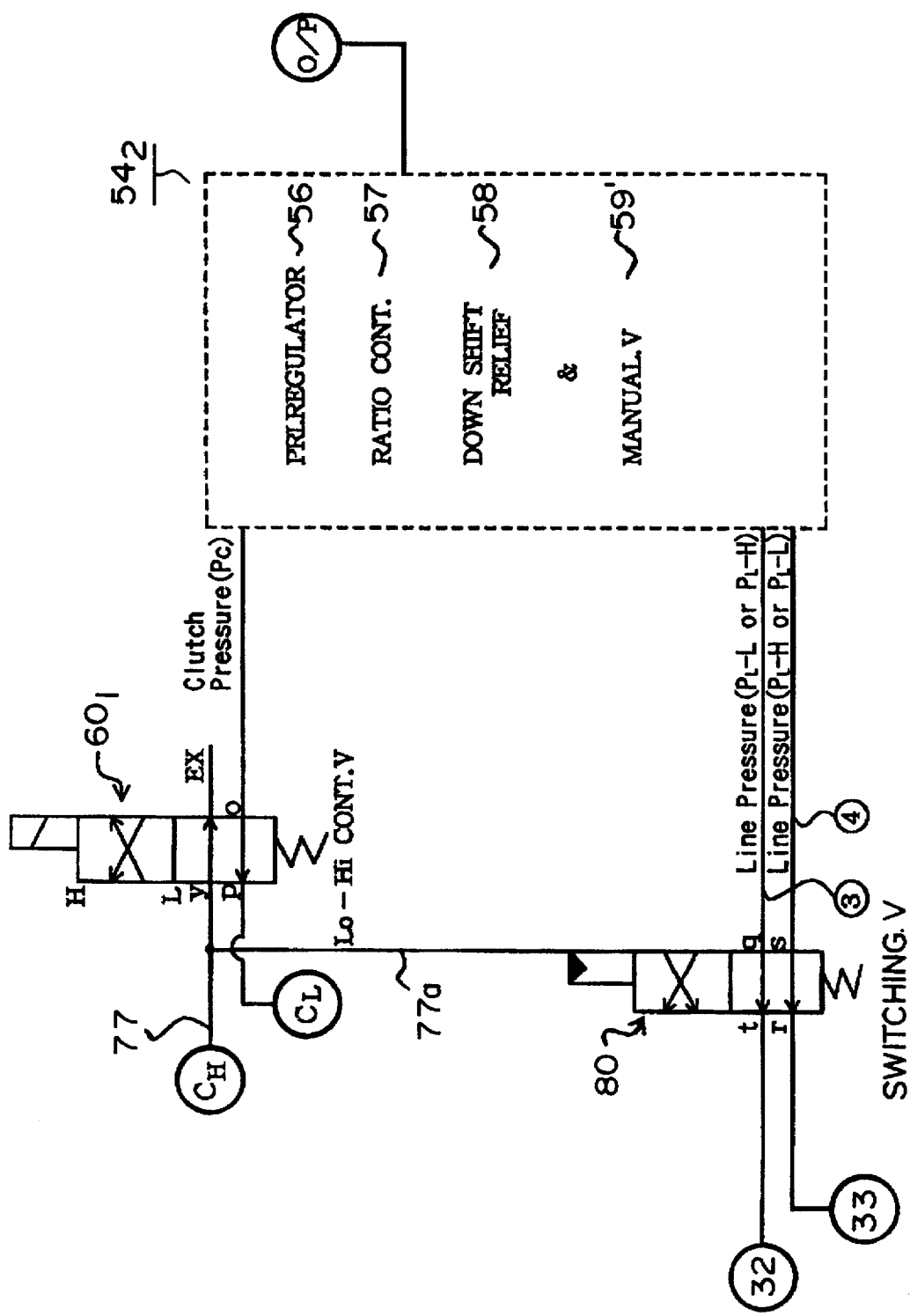
FIG. 15 is a diagram showing another partially modified hydraulic control mechanism applicable to the double chamber type hydraulic servos of FIG. 4.

Next, another partially modified control mechanism will be described with reference to FIG. 15. The control mechanism $54_2$ acts on a so-called double regulator type control mechanism having primary and secondary hydraulic servos 32, 33 as shown in FIG. 9. That is, hydraulic chambers 73 and 75 have identical pressure-receiving areas. Note, although the primary regulator valve 56, ratio control valve (secondary regulator valve) 57, down-shift relief valve 58 and manual valve 59' are similar to those of the embodiments shown in FIG. 10 to FIG. 12, this embodiment differs in that a low/high control valve $60_1$ is composed of a simple 2-position-switching solenoid valve with 4 ports and a switching valve 80 is provided which can switch a hydraulic pressure from the port y of the valve $60_1$ to the high clutch hydraulic servo $C_H$ as a pilot pressure.

In the low (L) mode in the D range, since the low/high control valve $60_1$ is located at the low (L) position, the port o communicates with the port P and the port y with the drain port Ex. Further, since the switching valve 80 is positioned as shown in the drawing, the oil passage 77 communicates with the drain port Ex, the port q with the port t and the port s with the port r. Note that since the manual valve 59' is located at the D range position at this time, the relatively high line pressure $P_L$-H from the primary regulator valve 56 is introduced to an oil passage (4) and the relatively low line pressure $P_L$-L from the ratio control valve 57 is introduced to an oil passage (3).

Therefore, the clutch pressure Pc from the manual valve 59' is supplied to the low clutch hydraulic servo $C_L$ through the ports o and p of the low/high control valve $60_1$, the relatively low line pressure $P_L$-L from the oil passage (3) is supplied to the primary hydraulic servo 32 through the ports q and t of the switching valve 80 and the relatively high line pressure $P_L$-H from the oil passage (4) is supplied to the hydraulic servo 33 through the ports s and r.

In this state, the low clutch $C_L$ is engaged and the axial force on the secondary pulley 9 exerted by the hydraulic servo 33, on which a somewhat higher line pressure acts, is made higher than that exerted on the primary pulley 7 in accordance with the direction in which torque is transmitted in the CVT unit 11.

Further, in the high (H) mode in the D range, since the low/high control valve $60_1$ is switched to the high (H) position, the port o communicates with the port y and the port p communicates with the drain port Ex. Since the switching valve 80 is switched by the pilot pressure from the oil passage 77a, when the clutch pressure $P_L$ is supplied to the oil passage 77 through the ports o and y, the port q communicates with the port r and the port s with the port t.

Therefore, the clutch pressure Pc is supplied to the high clutch hydraulic servo $C_H$, the relatively low line pressure $P_L$-L from the oil passage (3) is supplied to the secondary hydraulic servo 33 through the ports q and r of the switching valve 80 and the relatively high line pressure $P_L$-H from the oil passage (4) is supplied to the primary hydraulic servo 32 through the ports s and t.

In this state, the high clutch $C_H$ is applied and the axial force on the primary pulley 7 exerted by the hydraulic servo 32, on which a somewhat high line pressure acts, is made higher than that exerted on the secondary pulley 9, in accordance with the direction in which torque is transmitted in the CVT unit 11.

In reverse (R), the manual valve 59' is switched and the low/high control valve $60_1$ is held at the low (L) position as shown in FIG. 12. Therefore, the switching valve 80 is held in the lower position in the drawing, as in the above-described embodiment. In addition, the switching of the manual valve 59' causes the relatively high line pressure $P_L$-H from the primary regulator valve 56 to be introduced to the oil passage (3) and the relatively low pressure line pressure $P_L$-L to be introduced to the oil passage (4) from the ratio control valve 57. Further, the relatively low line pressure $P_L$-L from the ratio control valve 57 is introduced to the oil passage (4). Therefore, the clutch pressure $C_L$ is supplied to the low clutch hydraulic servo $C_L$ through the ports o and p, the somewhat higher line pressure $P_L$-H from the oil passage (3) is supplied to the primary hydraulic servo 32 through the ports q and t and the somewhat lower line pressure $P_L$-L from the oil passage (4) is supplied to the secondary hydraulic servo 33 through the ports s and r.

In this state, the low clutch $C_L$ is engaged and the axial force on the primary pulley 7 exerted by the hydraulic servo 32, on which a somewhat higher line pressure $P_L$-H acts, is made higher than that exerted on the secondary pulley 9, in accordance with the direction in which torque is transmitted in the CVT unit 11.

Figure 16:
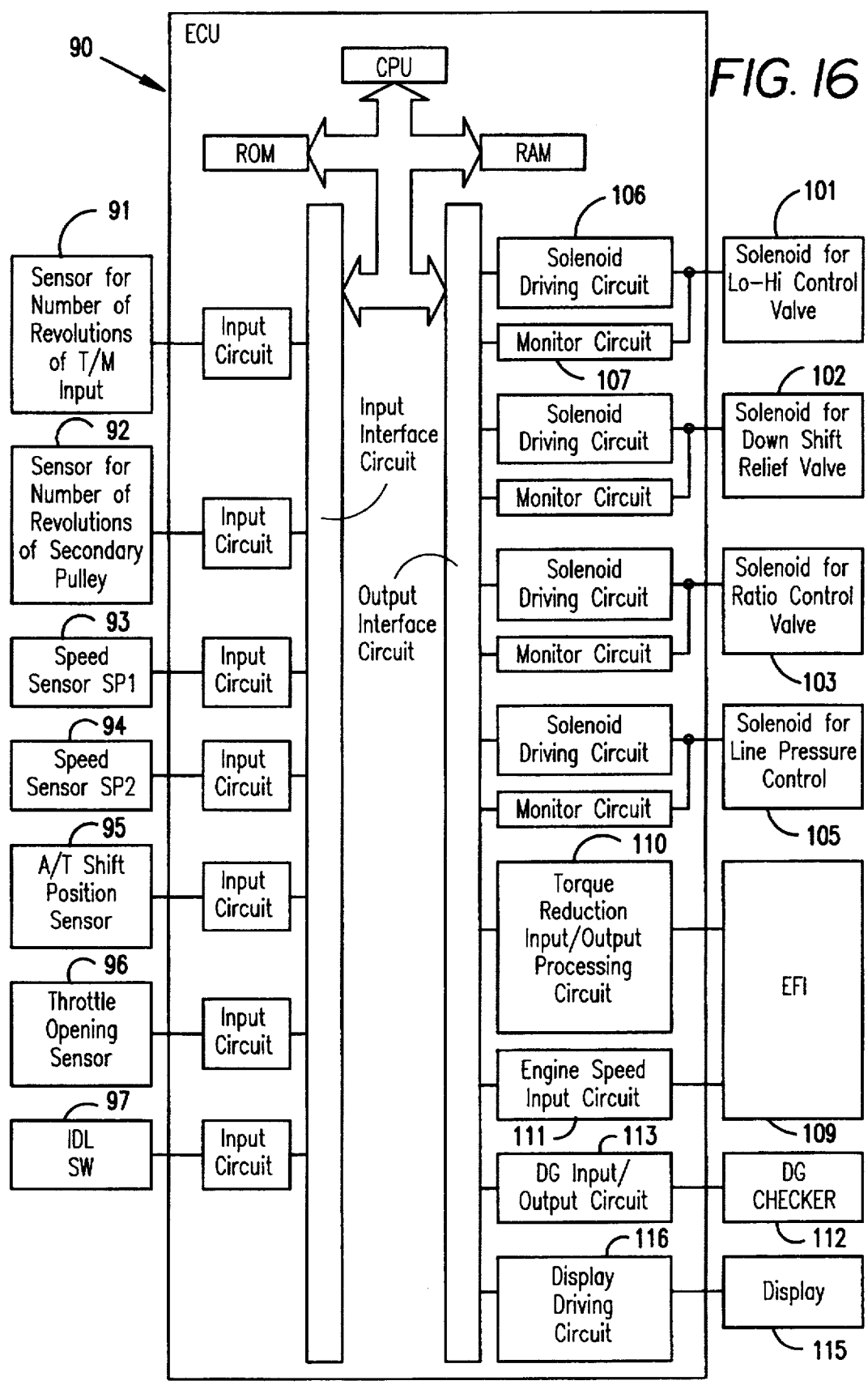
FIG. 16 is a block diagram of an electric control unit suitable for use in the present invention.

FIG. 16 is a block diagram of an electronic control unit (EUC) 90, wherein numeral 91 denotes a sensor disposed in or adjacent to the continuously variable transmission 1 for detecting the r.p.m. of the input shaft 2. A sensor 92 detects the r.p.m. of the secondary pulley 9 of the CVT unit 11, a vehicle speed sensor 93 detects the r.p.m. of the output shaft 5 of the continuously variable transmission and a similar vehicle speed sensor 94 is also used to generate a speed meter signal and as a backup device when the vehicle speed sensor 93 fails. A sensor 95 detects the selected shift position P, R, N or D of the shift lever or the manual valve of the continuously variable transmission. A sensor 96 is a potentiometer disposed in the engine for detecting throttle opening and a sensor 97 is integrated with the throttle opening sensor 96 to detect whether or not the accelerator is in an entirely closed state. The signals from the above respective sensors are received by a CPU, a ROM or a RAM through an input processing circuit and an input interface circuit, respectively.

A solenoid 101 for the low/high control valve 60 switches between to the low (L) mode and the high (H) mode to execute ON/OFF operation. A solenoid 102 operates the down-shift relief valve 58 for draining a high side circuit and is a duty or linear solenoid. A solenoid 103 operates the ratio control valve 57 to regulate the speed changing hydraulic pressure and is a duty or linear solenoid. A solenoid 105 is used to control the primary regulator valve 56 which, in turn, controls line pressure and is a linear solenoid. The above solenoids are driven through a solenoid drive circuit 106 which generates a predetermined voltage or output based on the signals from an output interface circuit, and the operations of the respective solenoids are checked by a monitor circuit 107 to determine a failure and the solenoids will execute self-diagnosis.

Numeral 109 denotes an electronic control unit for controlling the engine and numeral 110 denotes a circuit for issuing a signal for temporarily reducing torque generated by the engine by delaying the ignition timing angle, shutting off fuel supply etc. to ease shock caused by a speed change. Numeral 111 denotes a processing circuit for inputting engine r.p.m. Numeral 112 denotes a checker composed of an indicator lamp and the like for outputting the result of self-diagnosis when the electronic control unit 90 fails and numeral 113 denotes a circuit for outputting the result of the self-diagnosis in a failure. Numeral 115 denotes a display unit such as low (L) mode and high (H) mode display lamps and the like for displaying the state of the continuously variable transmission and numeral 116 denotes a drive circuit for driving the display unit 115.

Figure 17:
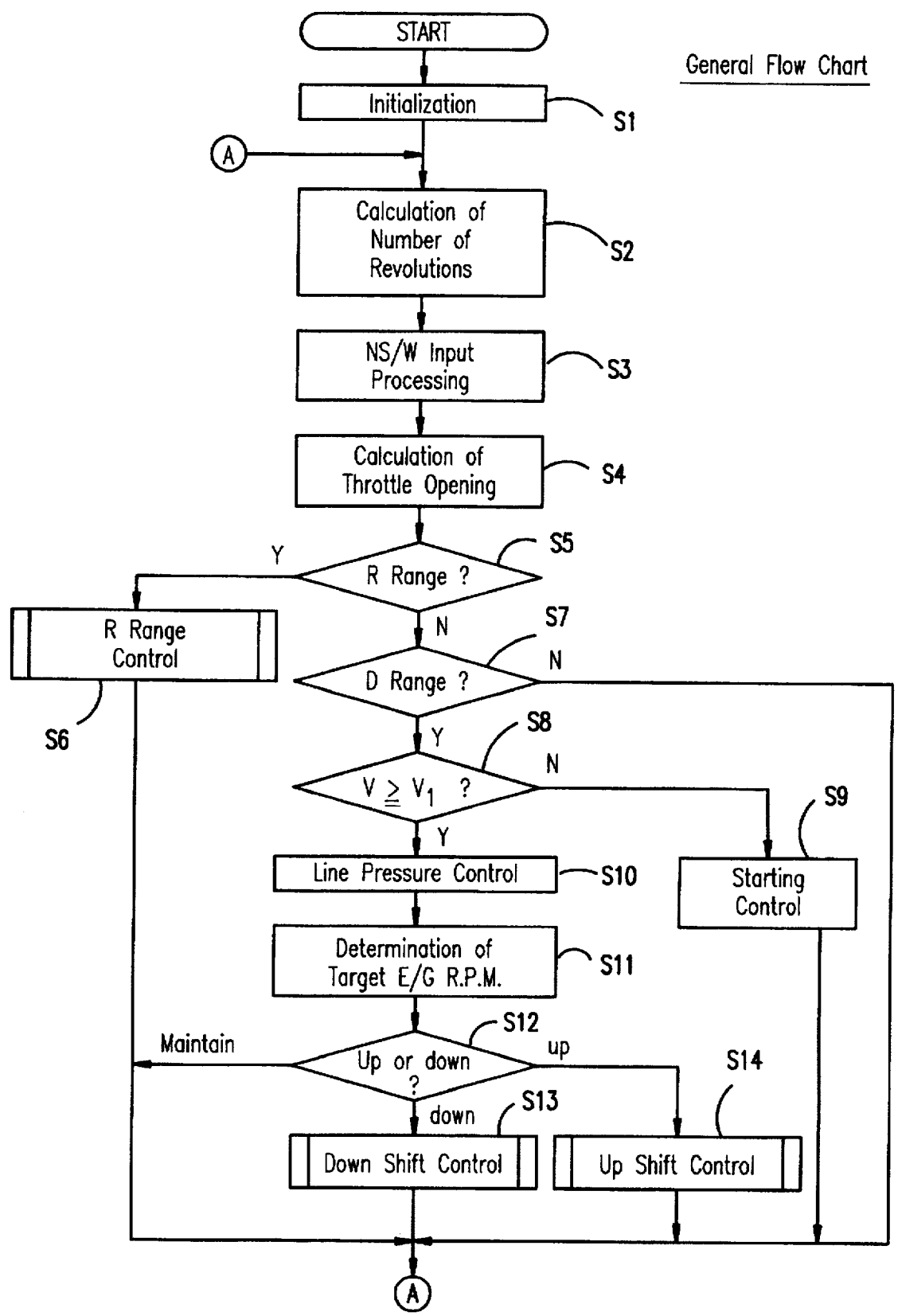
FIG. 17 is a flowchart of a main routine for operation of the electric control unit of FIG. 16.

FIG. 17 is a flowchart of a main routine for control of the continuously variable transmission, wherein all the steps are initialized at the beginning in step S1. At step S2, r.p.m. is calculated based on the signals from the above r.p.m. sensors 91, 92 and 93. The signal from a neutral start switch is processed and shift position is read at step S3 and throttle opening is calculated at step S4. Then, whether or not the manual valve is located in the reverse (R) range is determined based on the above step S3 at step S5, and when the determination is YES, an R range control subroutine is executed (step S6). When the determination is NO, whether or not the D range has been selected is determined (step S7), and when the D range is selected, it is determined whether or not the current vehicle speed V is equal to or less than a predetermined vehicle speed V1 (for example, 5 Km/h) (step S8). When the current vehicle speed is equal to or less than the vehicle speed, start control is executed (step S9), whereas when it is greater than the predetermined vehicle speed, line pressure control is executed to set a line pressure depending upon whether the low (L) mode is selected or the high (H) mode is selected, the throttle opening and the pulley ratio (step S10). Further, a target engine r.p.m. is read from a map of a predetermined optimum fuel efficiency curve based on the throttle opening at step S11. Then, one of a down-shift, an up-shift and the current state is selected by comparing the current engine r.p.m. with the above target engine r.p.m. (step S12) and the down-shift control subroutine (step S13) or the up-shift control subroutine (step S14) may next be executed.

Figure 18:
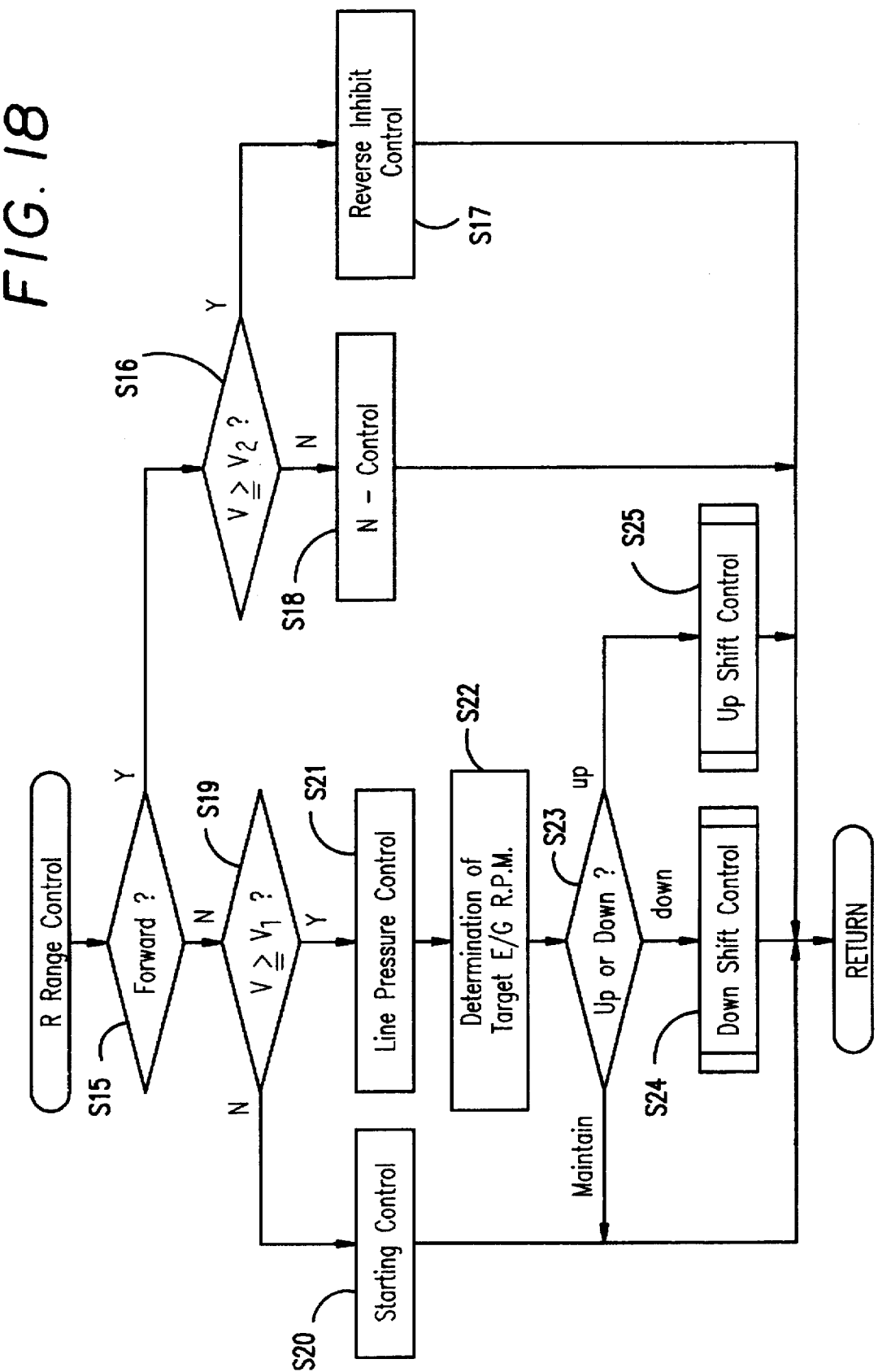
FIG. 18 is a flowchart of a reverse (R) range control subroutine—step S6 in the main routine of FIG. 17.

FIG. 18 is a flowchart of a subroutine for reverse (R) range control, wherein whether or not a vehicle is travelling forward is determined first from the pulley ratio and vehicle speed at step S15. When the vehicle is travelling forward, a determination is made as to whether or not the current vehicle speed V is greater than a predetermined vehicle speed V2 (for example, 5 Km/h) (step S16). When the current vehicle speed is greater than the predetermined vehicle speed, control prohibiting reverse operation is executed, for example, by release of both the low clutch $C_L$ and low clutch $C_L$, or the like (step S17), whereas when the vehicle speed is smaller than the predetermined vehicle speed, neutral (N) control is executed (step S18).

In the neutral control, the axial forces on the primary pulley 7 and secondary pulley 9 are controlled to be substantially equal. Otherwise, at a minimum, the difference between the axial force on the primary pulley and the axial force on the secondary pulley is set to a value smaller than the difference between the axial forces on the pulleys as is determined by the input torque of the CVT and the pulley ratio at the time when output torque is in a positive direction within a range in which the relative relationship in magnitudes of the axial forces is not reversed or to a value smaller than the difference between the axial forces on the primary and secondary pulleys as determined by the input torque of the CVT unit and the pulley ratio at the time when the output torque is in a negative direction within the range in which the relative relationship in magnitudes of the axial forces is not reversed. More specifically, in the double chamber type control mechanisms 54, 54₁ shown in FIG. 4 to FIG. 7 and FIG. 14, the hydraulic pressures in both the second hydraulic chambers 47, 49 are released, while hydraulic pressures are supplied to both the first hydraulic chambers 45, 46 so as to equalize the axial forces on both the pulleys 7 and 9. Further, in the double regulator type control mechanisms 54' and 54₂ shown in FIG. 9 to FIG. 12 and FIG. 15, equal hydraulic pressures are supplied to both the primary and secondary hydraulic servos 32 and 33 by entirely opening the ratio control valve (secondary regulator valve) 57 so as to equalize the axial forces on both the pulleys 7 and 9. With these operations, the CVT unit 11 converges by itself so that the output from the output shaft 5 becomes zero, regardless of the r.p.m. of the output shaft, and is stably maintained in the neutral position where the r.p.m. of the output shaft 5 becomes zero. The neutral control as described in the specification and drawings of Japanese Patent Application Laid-Open No. 7-66234 is applicable to this embodiment as is.

When it is determined that the vehicle is travelling in reverse at step S15, the current vehicle speed V is compared with the predetermined vehicle speed V1 (for example, 5 Km/h) (step S19) and when the current vehicle speed V is lower than the predetermined vehicle speed V1, start control is executed (step S20), whereas when the current vehicle speed V is higher than the predetermined vehicle speed V1, line pressure control is executed to set a line pressure based on the throttle opening and pulley ratio (step S21). Further, a target engine r.p.m. is determined by reading a map as described above (refer to step S10) at step S22. Then, either an up-shift, a down-shift or maintenance of the current state is selected in step S23, as in step S12 above, and the down-shift control (step S24) or the up-shift control (step S25) is executed, if appropriate.

The CVT unit 11 is located at the O/D end and the speed increasing rotation transmitted from the CVT unit to the sun gear 19s is combined with the constant speed rotation transmitted from the power transmission unit 26 to the carrier 19c by the planetary gear unit 19 and reverse rotation is output at the output shaft 5 which is integrally arranged with the ring gear 19r in the reverse (R) control. At this time, however, the torque output from the CVT unit 11 is reversed across the neutral position (output from the output shaft 5 is zero) with torque circulation and power is transmitted from the primary pulley 7 to the secondary pulley 9 in the CVT unit 11 as shown in FIG. 2. In the reverse control, the manual valves 59, 59' are located at the reverse (R) positions as shown in FIG. 7, FIG. 8, FIG. 12, FIG. 13, FIG. 14, FIG. 15 and the hydraulic pressure of the hydraulic servo 32 is set higher than that of the hydraulic servo 33 when positive torque is transmitted (transmitted to the engine and wheels).

Figure 23:
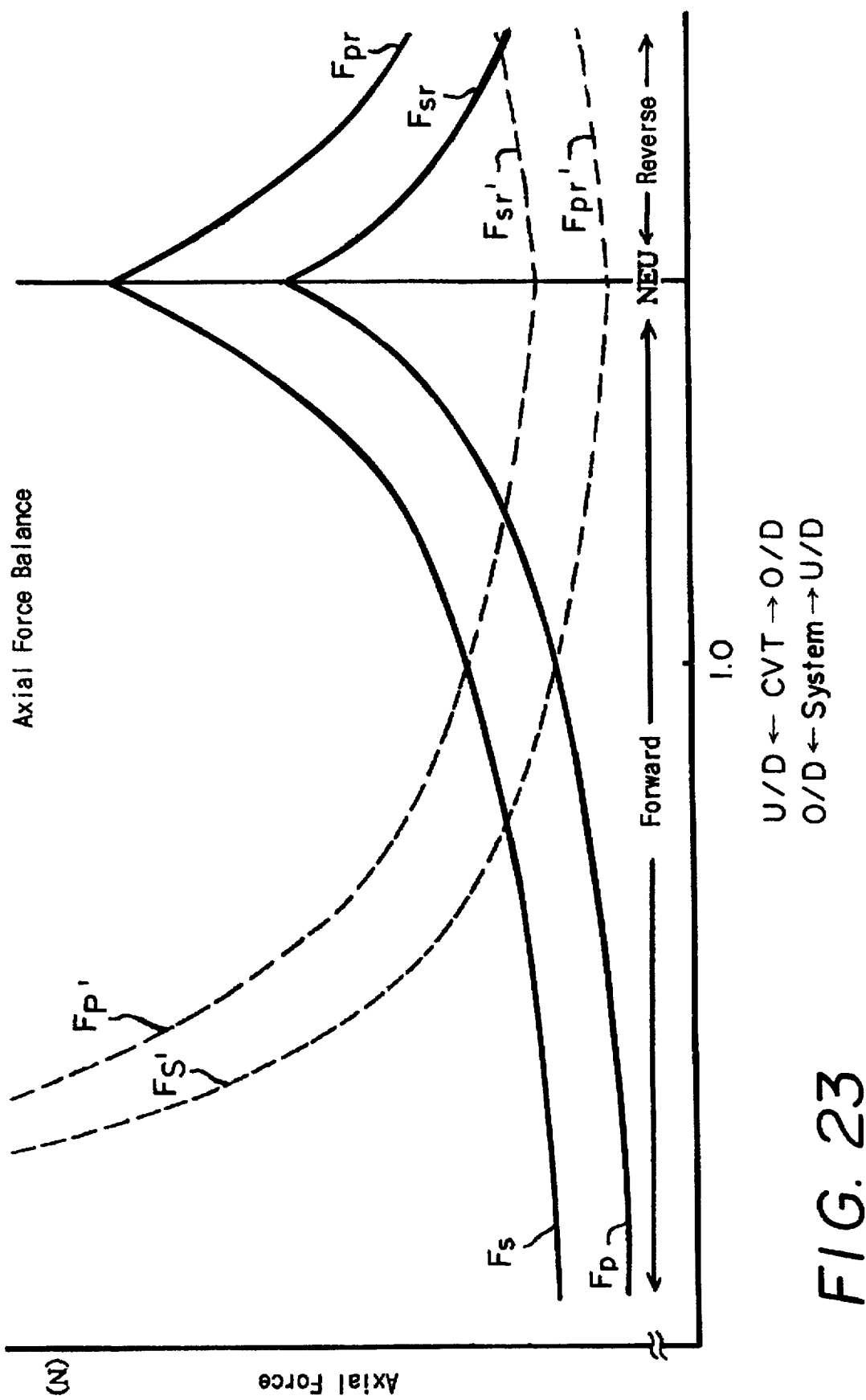
FIG. 23 is a graph of axial force versus ratios for the CVT (pulley ratio) and entire transmission system (gear ratio), illustrating the balance between the axial forces on the primary and secondary pulleys.

Consequently, the axial force Fpr of the primary pulley 7 is made higher than the axial force Fsr of the secondary pulley 9 as shown in FIG. 23 so that the relationship of axial forces coincides with the direction of torque transmission. In this state, the axial forces Fpr and Fsr on the pulleys 7,9 are properly changed so as to change speed under control of the ratio control valve 57.

Figure 19:
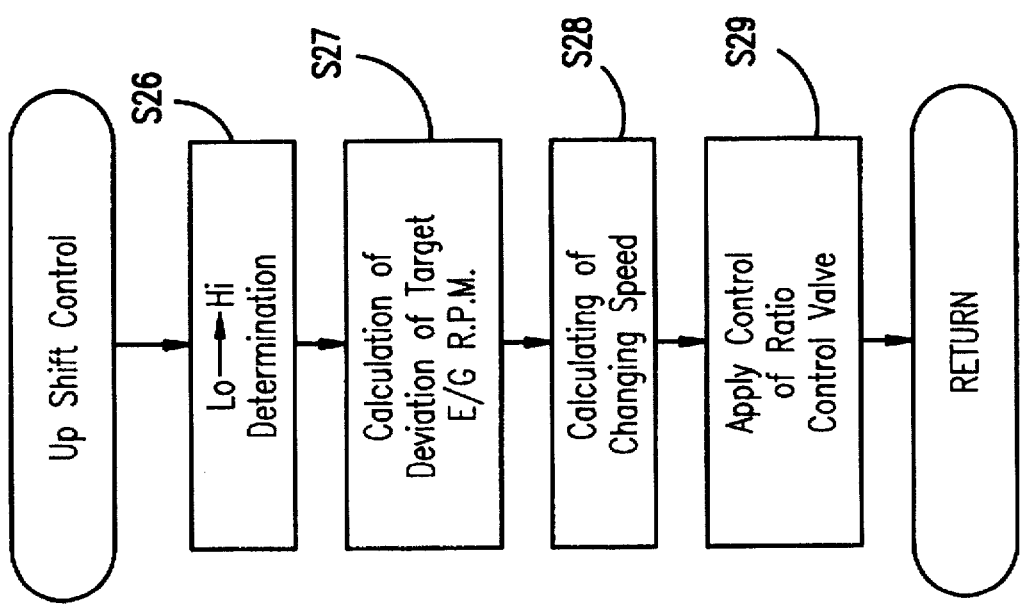
FIG. 19 is a flowchart of an up-shift control subroutine—step S14 in FIG. 17.

FIG. 19 is a flowchart of up-shift control in the D range shown at step S14, wherein it is determined whether speed is to be changed from the low (L) mode to the high (H) mode at step S26. Note that R range control is not executed at step S26. Further, the difference between a current engine r.p.m. and a target engine r.p.m. and the acceleration of the difference are calculated (step S27) and a speed changing speed is calculated based on the calculated difference (step S28), whereby the application control of the ratio control valve 57 is executed (step S29).

Figure 20:
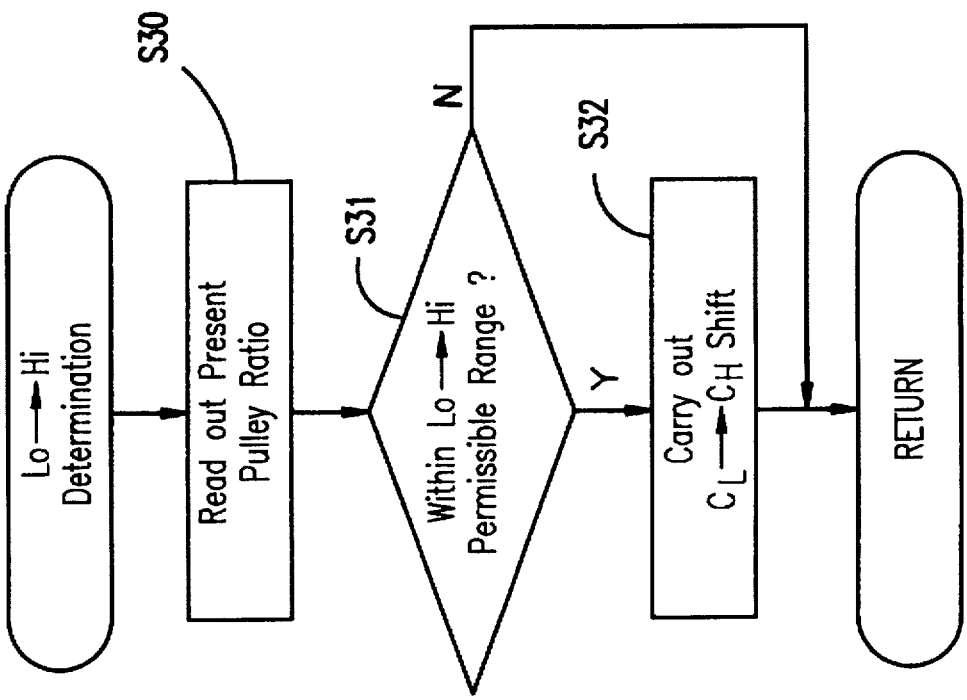
FIG. 20 is a flowchart of a Lo→Hi determining subroutine—step S26 in FIG. 19.

FIG. 20 is a subroutine of the determination of Lo→Hi in step S26. At step S30, a pulley ratio is calculated based on the signals from the r.p.m. sensors 91, 92 of the primary pulley 7 and secondary pulley 9. Then, it is determined whether the pulley ratio is within the range in which a speed change from the low mode to the high mode is permitted (step S31) and, when the pulley ratio is within that range, the low/high control valve 60 is switched to thereby disengage the low clutch $C_L$ and engage the high clutch $C_H$ (step S32).

Figure 21:
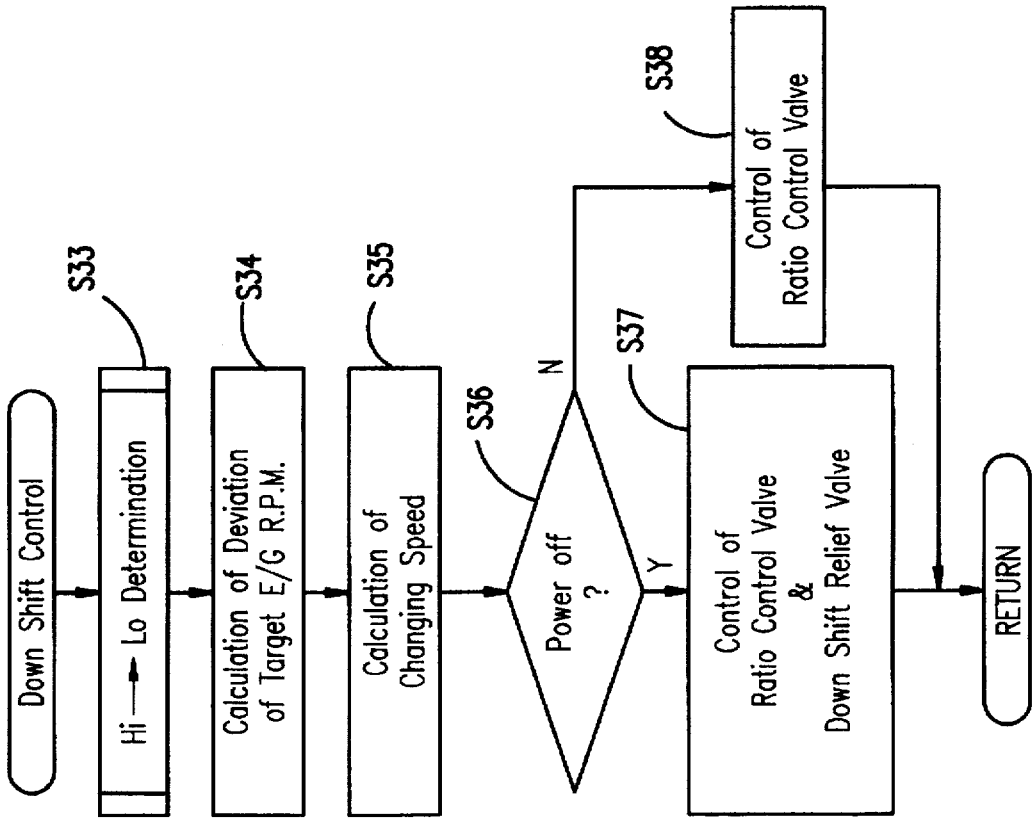
FIG. 21 is a flowchart of a down-shift control subroutine—step S13 in FIG. 17.

FIG. 21 is a flowchart for down-shift control shown at step S13, wherein it is determined at step S33 whether or not a speed change from the high (H) mode to the low (L) mode is to be executed (this is not executed in the R range control). Further, the difference between a current engine r.p.m. and a target engine r.p.m. and the acceleration of the difference are calculated (step S34) and a speed changing speed is calculated based on the calculated difference (step S35). Further, whether or not a down-shift is a power-off down-shift is determined based on the signals from the throttle opening sensor 96 and idle switch 97 (step S36). Then, when a state of coasting is achieved by power-off, that is, by releasing the accelerator pedal, or the like, the ratio control valve 57 and the down-shift relief valve 58 are controlled (step S37), whereas when down-shift is executed in a power-on state, that is, when the accelerator pedal is abruptly depressed, the ratio control valve 57 is controlled (step S38).

Coasting is a negative torque state in which torque is transmitted from the wheels to the engine as shown at step S37. In the negative torque state, however, the relative relationship in magnitude between the axial force Fp' (Fpr') of the primary pulley 7 and the axial force Fs' (Fsr') of the secondary pulley 9 is reversed from the axial forces Fp, Fs (Fpr, Fsr) in a positive torque (engine wheels) state shown by the solid lines of FIG. 23, as shown by the dash lines of the drawing. At this time, since the down-shift relief valve 58 is drained as shown in FIG. 5, the first hydraulic chamber 46 of the secondary hydraulic servo 33 is released, whereby the axial force Fp' of the primary pulley 7 is made higher than the axial force Fs' of the secondary pulley 9, thus the speed change of the CVT unit 11 is controlled by the ratio control valve 57.

Further, in the double regulator type control mechanism 54' shown in FIG. 10, since the down-shift relief valve 58 is drained, the secondary hydraulic servo 33 is released, whereby the axial force Fp' on the primary pulley is made higher than the axial force Fs' on the secondary pulley.

Note that although an oil supply to the primary hydraulic servo 32 is switched from that to the secondary hydraulic servo 33, by the manual valve placed in reverse (R) as shown in FIG. 7 and FIG. 11, the pressure of the hydraulic servo having a higher hydraulic pressure is reduced so that the axial force Fsr' of the secondary pulley is made higher than the axial force Fpr' of the primary pulley.

Further, down-shift control is executed at step S38 when power is turned on. Since the ratio control valve 57 is controlled in a pressure reducing direction in the double chamber type control mechanism 54 shown in FIG. 5, the hydraulic pressure of the secondary hydraulic servo 33 is made relatively lower than that of the primary hydraulic servo 32, whereas since the ratio control valve 57 is controlled in a pressure increasing direction in the double regulator type control mechanism 54' shown in FIG. 10, the hydraulic pressure of the secondary hydraulic servo 33 is made relatively lower than that of the primary hydraulic servo 32. With this operation, since the ratio of the axial force Fs of the secondary pulley to that of the axial force Fp of the primary pulley is reduced, the speed of the CVT unit 11 is abruptly changed in a speed increasing (O/D) direction and thus the speed of the transmission 1 is abruptly changed in a speed reducing (U/D) direction as a whole.

Figure 22:
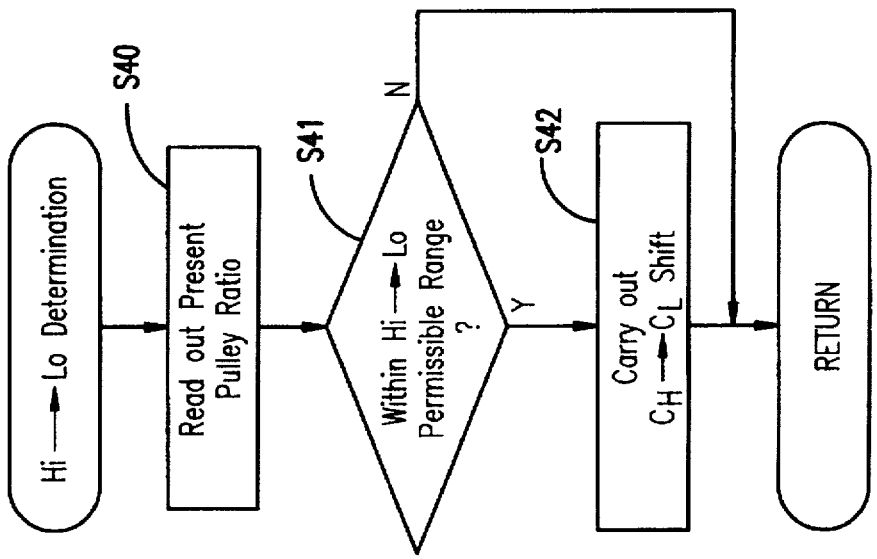
FIG. 22 is a flowchart of a Hi→Lo determining subroutine—step S33 in FIG. 21.

FIG. 22 shows a subroutine for determining Hi-Lo at the above step S33. A current pulley ratio is read based on the signals from the r.p.m. sensors of the primary pulley 7 (=input shaft 3) and secondary pulley 9 (step S40) and it is determined whether the pulley ratio is within that range in which a speed change is permitted from the high mode to the low mode (step S41). When the pulley ratio is within that range, the low/high control valve 60 is switched so as to change the engagement from the high clutch $C_H$ to the low clutch $C_L$ (step S42).

The speed is changed between the low (L) mode and high (H) mode by the change of engagement between the low clutch $C_L$ and the high clutch $C_H$ executed at the above steps S32 and S42. In the low mode, a positive rotation is output from the output shaft 5 by the aforesaid combination of both the output of the power transmission unit 26 and the output of the CVT unit 11 within the planetary gear unit 19. In this manner, power is transmitted from the secondary pulley 9 to the primary pulley 7 with torque circulation through the CVT unit 11. On the other hand, in the high mode, since the rotational output from the CVT unit 11 is transmitted to the output shaft 5 as is, power is transmitted from the primary pulley 7 to the secondary pulley 9 in the CVT unit 11.

At this time, the hydraulic pressures of the primary hydraulic servo 32 and secondary hydraulic servo 33 are switched by switching the low/high control valves 60, 60' and 601 as shown in FIG. 6, FIG. 11, FIG. 14 and FIG. 15. With this operation, the axial force FS of the secondary pulley 9 is made higher than the axial force FP of the primary pulley 7 in the low mode and the axial force of the primary pulley is made higher than that of the secondary pulley in the high mode in order to coincide with the direction of power transmission. Note that the above description relates to the transmission of positive torque and this is reversed in the transmission of negative torque by the down-shift relief valve as described above.

Next, a modified example of the power transmission mechanism of the continuously variable transmission will be described with reference to FIG. 24.

FIG. 24 shows an embodiment using a dual pinion planetary gear unit 19. The ring gear 19r of the planetary gear can be coupled with the input shaft 3 through gears 130, 131 and the low clutch $C_L$ (first rotary element), the sun gear 19s thereof can be coupled with the secondary pulley 9 through gears 132, 133 (second rotary element), the carrier 19c thereof can be coupled with the output shaft 5 (third rotary element) and the ring gear 19r can be coupled with the sun gear 19s through the high clutch $C_H$. Then, the ring gear 19r and sun gear 19s will rotate in the same direction. Note that the third rotary element may be the sun gear instead of the carrier and the first and second rotary elements may be any of the carrier, the sun gear and the ring gear which does not serve as the third rotary element.

Figures 24A, 24B:
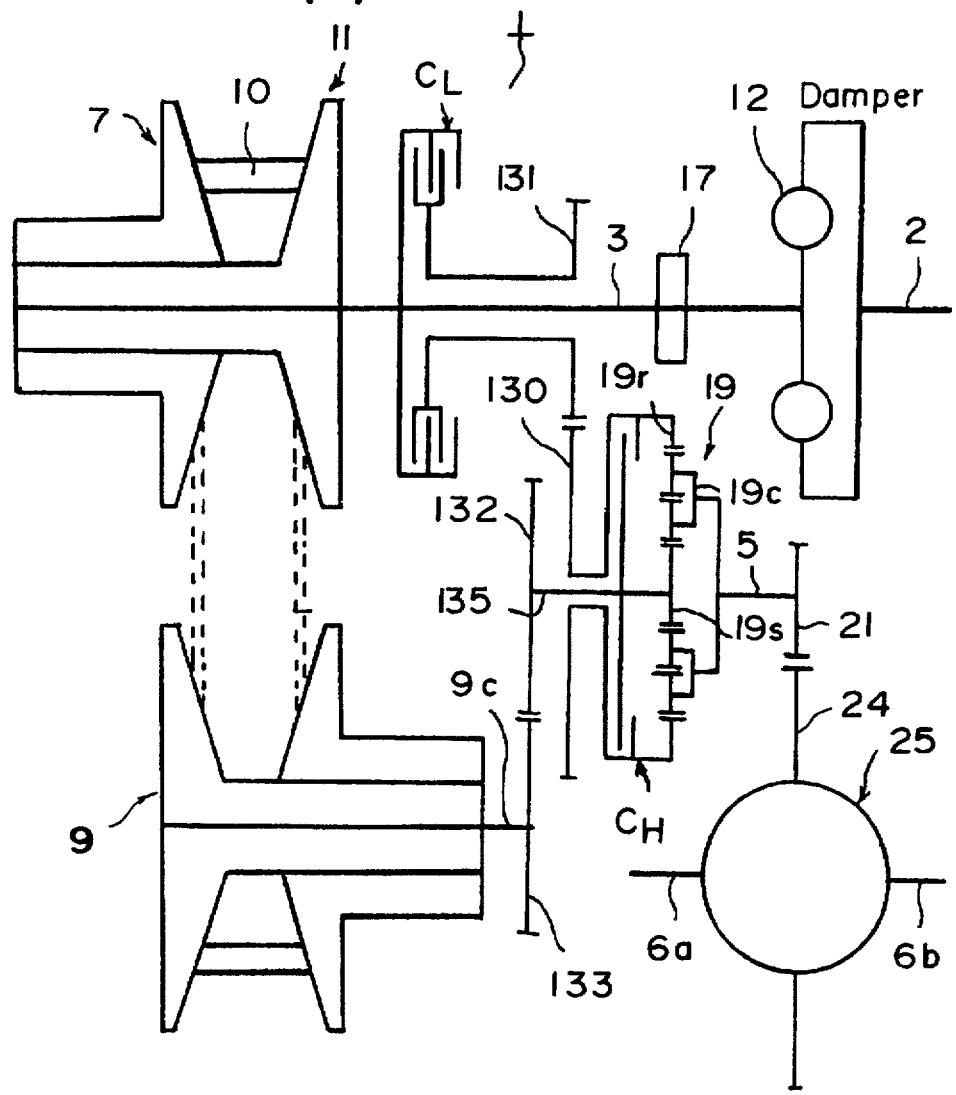
FIG. 24(a) is a skeletal diagram of another embodiment of the power transmission system of the invention.
FIG. 24(b) is a speed graph for the embodiment of FIG. 24(a).

In this embodiment the engine torque from the input shaft 3 is transmitted to the ring gear 19r of the planetary gear unit 19 through the low clutch $C_L$ and gears 131, 130 as well as to the sun gear 19s through the CVT unit 11 and gears 133, 132 in the low mode (Lo) as shown in the speed graph of FIG. 24(b). At this time, torque circulation is caused by the planetary gear unit 19 as in the previously described embodiment and output is from the carrier 19c to the output shaft 5 in an increasing/decreasing direction opposite to that of the CVT unit 11 with the secondary pulley 9 serving as a driving side and the primary pulley 7 serving as a driven side in the CVT unit 11. Further, when the CVT unit 11 is in a predetermined speed increasing (O/D) state, the rotation of the carrier 19c is reversed, that is, made to output reverse (Rev) rotation and the direction in which torque is transmitted from the CVT unit 11 is likewise reversed. In addition, in the high mode (Hi), the engine torque from the output shaft 5 is transmitted to a shaft 135 through the CVT unit 11 and gears 133, 135 and the planetary gear unit 19 is integrally rotated due to engagement of the high clutch $C_H$ in the high mode, and thus the speed changing torque of the shaft 135 is transmitted to the output shaft 5 as is in the CVT unit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A continuously variable transmission system for speed change of rotation received from an engine output shaft and for transmitting that rotation, at the changed speed to vehicle wheels, said system comprising:

an input shaft for receiving engine torque from the engine output shaft;

an output shaft for outputting torque to the vehicle wheels;

a belt type continuously variable transmission unit having a first pulley for receiving engine torque from said input shaft, a second pulley, a belt trained around both of said first and second pulleys and axial force actuating means for changing the pulley ratio of said first and second pulleys by applying axial forces to said first and second pulleys;

a planetary gear unit having a first rotary element rotatable with said input shaft, a second rotary element rotatable with said second pulley and a third rotary element rotatable with said output shaft;

a first clutch, interposed between said input shaft and said first rotary element, for engaging and disengaging power transmission therebetween;

a second clutch, interposed between any two of said first, second, and third rotary elements of said planetary gear unit, for engaging and disengaging power transmission therebetween;

low-high shifting means for shifting between a low mode for providing a comparatively high torque ratio by engaging said first clutch and a high mode for providing a comparatively low torque ratio by engaging said second clutch, wherein direction of torque transmission between said first pulley and said second pulley of said belt type continuously variable transmission unit is changed by switching between said low mode and said high mode;

control means for controlling said axial force actuating means so that axial forces acting on said first and second pulleys produce a difference corresponding to the pulley ratio of said first and second pulleys; and switching means for changing the relative relationship in magnitude between the axial forces which act on said first and second pulleys, responsive to switching between said low mode and said high mode by said low-high shifting means, so that said relative relationship in magnitude is reversed.

2. A continuously variable transmission system according to claim 1, wherein:

said axial force actuating means comprises a first hydraulic servo acting on said first pulley and a second hydraulic servo acting on said second pulley, said axial force actuating means applying axial forces to said first and second pulleys by supplying hydraulic pressures to said first and second hydraulic servos; and said switching means is a switching valve for switching the hydraulic pressure acting on said first hydraulic servo and the hydraulic pressure acting on said second hydraulic servo.

3. A continuously variable transmission system according to claim 2, wherein:

said low-high shifting means is a low-high shifting valve, which is located in an oil passage for supplying said hydraulic pressure from an oil pump to said first and second hydraulic servos and wherein said low-high shifting valve switches between supply and release of said first and second hydraulic servos, and wherein said switching valve is integrally constructed with said low-high shifting valve.

4. A continuously variable transmission system according to claim 2, wherein:

said low-high shifting means is a low-high shifting valve, which is located in an oil passage for supplying said hydraulic pressure from an oil pump to said first and second hydraulic servos, and switches between supply and release of said hydraulic servos, and wherein said switching valve is separate from said low-high shifting valve and is switched by hydraulic pressure of said first or second hydraulic servo, as determined by the switching of said low-high shifting valve.

5. A continuously variable transmission system according to claim 2, wherein:

each of said first and second hydraulic servos has a plurality of hydraulic chambers, wherein said switching valve selectively switches different hydraulic pressures between said plurality of hydraulic chambers to thereby reverse the effective pressure-receiving areas of said first and second hydraulic servos.

6. A continuously variable transmission system according to claim 5, wherein each of said first and second hydraulic servos has at least a first hydraulic chamber and a second hydraulic chamber, and wherein the first hydraulic chambers of both of said hydraulic servos have identical effective pressure-receiving areas;

wherein said control means includes a regulator valve and a ratio control valve, wherein the hydraulic pressure from said regulator valve is continuously supplied to the first hydraulic chambers of both of said hydraulic servos and the hydraulic pressure from said ratio control valve is supplied to the second hydraulic chamber of any one of said hydraulic servos; and wherein said switching valve reverses the communication of said ratio control valve between said second hydraulic chambers.

7. A continuously variable transmission system according to claim 6, wherein said regulator valve and said ratio control valve are interposed between an oil pump and said switching valve.

8. A continuously variable transmission according to claim 2, further comprising an oil pump, wherein said control means includes first and second regulator valves for adjusting the hydraulic pressure from said oil pump to respective different first and second hydraulic pressures, wherein one of said first and second regulator valves communicates with one of said first and second hydraulic servos and the other of said regulator valves communicates with the other of said hydraulic servos; and wherein said switching valve reverses the communication of said first and second regulator valves with said first and second hydraulic servos.

9. A continuously variable transmission system according to claim 8, wherein said first and second regulator valves are interposed between said oil pump and said switching valve.

10. A continuously variable transmission system according to claim 2, further comprising:

a relief valve for reducing the hydraulic pressure within one of said first and second hydraulic servos from a higher to a lower hydraulic pressure, as compared to the hydraulic pressure in the other of said hydraulic servos, responsive to a determination that the vehicle is in a state of coasting.

11. A continuously variable transmission system according to claim 1, comprising:

detecting means for detecting pulley ratio of said belt type continuously variable transmission unit, and determining means for determining whether or not a switching operation by said low-high shifting means is needed, responsive to the determination of said detecting means.

12. A continuously variable transmission system according to claim 1, wherein when said first clutch is engaged, said input shaft is coupled with said first pulley and said first rotary element, respectively, so that the direction of torque transmission in said input shaft from said first pulley and the direction of torque transmission in said input shaft from said first rotary element are opposite.

* * * * *

UNITED STATES PATENT AND TRADEMARK OFFICE
CERTIFICATE OF CORRECTION

PATENT NO. : 5,669,846
DATED : September 23, 1997
INVENTOR(S) : MOROTO et al

It is certified that error appears in the above-indentified patent and that said Letters Patent is hereby corrected as shown below:

Col. 4, line 63, "$(CH_H)$" should read --$C_H$--.

Col. 9, line 45, "$1$" should read --1--.

Col. 10, line 64, "1" should read --1--.

Col. 11, line 35, "1" should read --1--.

Col. 12, line 45, "1" should read --1--.

Col. 13, line 24, "75," should read --$75_1$--.

Col. 14, line 16, "range" should read --D range--.

Col. 26, line 14, after "1," insert --further--.

Signed and Sealed this

Seventeenth Day of November, 1998

Attest:

BRUCE LEHMAN

Attesting Officer

Commissioner of Patents and Trademarks